US012071906B2

(12) United States Patent
Chiera et al.

(10) Patent No.: US 12,071,906 B2
(45) Date of Patent: Aug. 27, 2024

(54) COMBUSTION CONTROL FOR AMMONIA FUELED ENGINE

(71) Applicant: Woodward, Inc., Fort Collins, CO (US)

(72) Inventors: Domenico Chiera, Fort Collins, CO (US); Gregory James Hampson, Boulder, CO (US)

(73) Assignee: Woodward, Inc., Fort Collins, CO (US)

( * ) Notice: Subject to any disclaimer, the term of this patent is extended or adjusted under 35 U.S.C. 154(b) by 38 days.

(21) Appl. No.: 17/935,495

(22) Filed: Sep. 26, 2022

(65) Prior Publication Data

US 2023/0101071 A1   Mar. 30, 2023

Related U.S. Application Data

(60) Provisional application No. 63/248,877, filed on Sep. 27, 2021.

(51) Int. Cl.
*F02D 41/00* (2006.01)
*F01N 3/10* (2006.01)
(Continued)

(52) U.S. Cl.
CPC ........... *F02D 41/0025* (2013.01); *F01N 3/10* (2013.01); *F02D 41/009* (2013.01);
(Continued)

(58) Field of Classification Search
CPC ........ F01N 3/10; F02D 19/0644; F02D 19/40; F02D 35/023; F02D 35/028;
(Continued)

(56) References Cited

U.S. PATENT DOCUMENTS 7,832,195 B2 * 11/2010 Takahashi ............. F02D 31/003
60/284
10,012,155 B2    7/2018 Barta et al.
(Continued)

FOREIGN PATENT DOCUMENTS

EP         3542043         9/2020

OTHER PUBLICATIONS

International Search Report and Written Opinion in International Application No. PCT/US2022/077079, dated Jan. 23, 2023, 18 pages.

(Continued)

*Primary Examiner* — Dapinder Singh
(74) *Attorney, Agent, or Firm* — Fish & Richardson P.C.

(57) ABSTRACT

The subject matter of this specification can be embodied in, among other things, a method performed in connection with an internal combustion engine, and the method including receiving a pressure signal from a combustion chamber pressure sensor during a first range of volumes, the first range corresponding to a portion of a compression phase, the received pressure being a first pressure, providing, based on the received pressure signal, a first pulse of fuel at a first position of the body during the compression phase, and providing, based on the received pressure signal a second pulse of fuel at a second position of the body during the compression phase.

17 Claims, 9 Drawing Sheets

(51) Int. Cl.
    *F02D 41/40*        (2006.01)
    *F02D 41/38*        (2006.01)

(52) U.S. Cl.
    CPC ...... *F02D 41/402* (2013.01); *F02D 2041/389* (2013.01); *F02D 2200/024* (2013.01)

(58) Field of Classification Search
    CPC .............. F02D 41/0025; F02D 41/009; F02D 41/3047; F02D 41/402; F02D 2041/389; F02D 2200/024; Y02T 10/12; Y02T 10/40
    See application file for complete search history.

(56) References Cited

U.S. PATENT DOCUMENTS

| | | | | |
|---|---|---|---|---|
| 10,823,105 | B2* | 11/2020 | Sanborn | ................. F02D 41/38 |
| 2011/0265455 | A1* | 11/2011 | Hirota | ................. F02D 19/0644 |
| | | | | 60/285 |
| 2015/0285178 | A1* | 10/2015 | John | ..................... F02D 41/005 |
| | | | | 123/27 R |
| 2018/0328304 | A1* | 11/2018 | Pursifull | ............. F02D 41/2467 |
| 2018/0340487 | A1* | 11/2018 | Morris | ................ F02D 41/3094 |

OTHER PUBLICATIONS

Brohi, "Ammonia as fuel for internal combustion engines?," Master's Thesis, Chalmers University of Technology, 2014, 43 pages.

Dieselnet.com [online], "Selective Catalytic Reduction," Nov. 1, 2020, retrieved on Jan. 23, 2023, retrieved from URL <https://dieselnet.com/tech/cat_scr.php>, 5 pages.

Kong, "Combustion Efficiency and Exhaust Emissions of Ammonia Combustion in Diesel Engines," Presented at the 4th Annual Conference on Ammonia, Oct. 15-16, 2007, San Francisco, California, 16 pages.

Reiter et al., "Demonstration of Compression-Ignition Engine Combustion using Ammonia in Reducing Greenhouse Gas Emissions," Energy & Fuels, Jul. 2008, 22(5):2963-2971.

* cited by examiner

COMBUSTION CONTROL FOR AMMONIA FUELED ENGINE

CROSS-REFERENCE TO RELATED PATENT APPLICATIONS

This application claims the benefit of U.S. Provisional Application No. 63/248,877, filed Sep. 27, 2021, the contents of which are incorporated by reference herein.

TECHNICAL FIELD

This instant specification relates to combustion and emissions control of dual-fuel engines.

BACKGROUND

Internal combustion engines, including diesel engines and dual-fuel diesel-ammonia engines, ignite an air-fuel mixture to produce combustion in one or more engine cylinders. Typical internal combustion engine systems inject fuel and air into a combustion chamber (e.g., the cylinder) of the engine and ignite the fuel-air mixture using an igniter, such as a spark plug, pilot quantity of diesel using compression ignition, or via volumetric auto-ignition. In response to consumer and regulatory demands, typical internal combustion engines push the limits on combustion towards more fuel-efficient operation modes, such as those that use lean, advanced or low-temperature combustion to reduce fuel combustion. However, diesel-ammonia combustion causes the production of nitrous oxides and the passage of excess ammonia fuel (i.e., ammonia slip) as exhaust pollutants.

SUMMARY

In general, this document describes systems and methods for combustion and emissions control of dual-fuel engines.

In an example embodiment, an apparatus for controlling operation of an internal combustion engine, the engine having a body sealed in a combustion chamber, the body being moveable to a center position to compress at least one of a gas or gas/liquid mixture in a compression phase and movable from the center position by expanding combustion gasses in an expansion phase, each position of the body defining a volume of the combustion chamber, and the apparatus including a processor to receive input from a position sensor configured to sense a position of the body corresponding to the volume of the combustion chamber and from a combustion chamber pressure sensor, the processor configured to receive a pressure signal from the combustion chamber pressure sensor during a first range of volumes, the first range corresponding to a portion of the compression phase, the received pressure being a first pressure, provide, based on the received pressure signal, a first signal configured to provide a first pulse of fuel at a first position of the body during the compression phase, and provide, based on the received pressure signal, a second signal configured to provide a second pulse of fuel at a second position of the body during the compression phase.

Various embodiments can include some, all, or none of the following features. The first signal can be configured to prepare an air/fuel mixture that is near auto-ignition. The second signal can be further configured to start combustion in the combustion chamber. The second signal can be configured to control at least one of CA50 or CA 10. The second signal can be configured to control a ratio of $NH_3$/NOx resulting from combustion of diesel fuel, ammonia fuel, and air. The ratio can be greater than about 1. 1.2. The apparatus can include an exhaust after-treatment system configured to receive free ammonia present in exhaust gasses and catalyze NOx based on ammonia.

In an example implementation, a method is performed in connection with an internal combustion engine comprising a body sealed in a combustion chamber, the body being moveable to a center position to compress at least one of a gas or a gas/liquid mixture in a compression phase and movable from the center position by expanding combustion gasses in an expansion phase, each position of the body defining a volume of the combustion chamber, and the method includes receiving a pressure signal from a combustion chamber pressure sensor during a first range of volumes, the first range corresponding to a portion of a compression phase, the received pressure being a first pressure, providing, based on the received pressure signal, a first pulse of fuel at a first position of the body during the compression phase, and providing, based on the received pressure signal a second pulse of fuel at a second position of the body during the compression phase.

Various implementations can include some, all, or none of the following features. The first pulse of fuel can be further configured to prepare an air/fuel mixture that is near auto-ignition. The method can include starting combustion in the combustion chamber based on the second pulse of fuel. The method can include controlling CA50 based on at least one of the first pulse of fuel or the second pulse of fuel. The method can include controlling a ratio of $NH_3$/NOx resulting from combustion of diesel fuel, ammonia fuel, and air during the expansion phase based on at least one of the first pulse of fuel or the second pulse of fuel. The ratio can be about 1. The ratio can be between 1.0 and about 1.2. The method can include receiving, by an exhaust after-treatment system, free ammonia present in exhaust gasses, and catalyzing, by the exhaust after-treatment system, NOx based on free ammonia. The method can include controlling an amount of free ammonia present in exhaust gasses based on at least one of the first pulse of fuel or the second pulse of fuel.

The systems and techniques described here may provide one or more of the following advantages. First, a system can improve the usability of ammonia as a renewable fuel source (e.g., by improved combustion of an otherwise difficult to burn fuel—$NH_3$, which by itself is carbon-free, so has a GHG reduction benefit). Second, the system can improve the emissions that result from the combustion of fuel (e.g., by using $NH_3$ slip to reduce NOx in an SCR). Third, the system can reduce or eliminate the need for high-grade urea (e.g., diesel exhaust fluid or "DEF") and related delivery systems for use in exhaust gas after-treatment systems.

The details of one or more implementations are set forth in the accompanying drawings and the description below. Other features and advantages will be apparent from the description and drawings, and from the claims.

DETAILED DESCRIPTION

There is a quest for low and zero carbon fuels for internal combustion engines. The technical goal of engine development is to achieve high efficiency and high power density, but with nearly zero emissions.

Hydrogen is considered a primary candidate as a fuel to achieve such objectives. It is a good combustion fuel with low ignition energy requirement, wide AFR, and fast burn rate. However, pure hydrogen ($H_2$), is energetically expensive to make, and its natural state is a gas at room temperature and pressure, so for transportation use, hydrogen is highly pressurized (e.g., 10,000 psi) or liquefied (e.g., at temperatures below −250 C), and it is hard to handle safely (e.g., leakage, explosiveness).

An alternative to pure $H_2$ is the addition of a nitrogen molecule to make ammonia, $NH_3$. Ammonia will have a higher energy density to relative $H_2$, since it can be stored as a liquid at only about 15 psi gauge. Ammonia can be used as a fuel, but it has some characteristics that are nearly the opposites of hydrogen: ammonia is hard to ignite, slow to burn, burns with a low temperature, and for the most part needs some sort of combustion enhancement. A practical fuel introduction method for ammonia is port injected as a vapor, in which liquid ammonia is vaporized in a suitable cooling water circuited heat exchanger. Also known as port fuel injection (PFI), this produces a premixed charge of air and ammonia. It is also possible to inject ammonia directly into the cylinder with a high-pressure direct injector, or in the case of dual fuel, a high-pressure dual fuel (HPDF) injector.

To enhance the ignitability of ammonia, it is possible to use diesel fuel for combustion initiation and burning rate enhancement. Ammonia combustion in diesel can generate two regulated criterion emissions: nitrous oxides (NOx) and unburned ammonia ($NH_3$) in addition to $N_2O$, which might be generated in a poorly operating catalyst. NOx can result from high temperature diesel-driven diffusion flame and the nitrogen available from atmospheric air (e.g., ~79% $N_2$ to ~21% $O_2$). Unburned ammonia, also referred to as ammonia slip, resulting from processes similar to those found to cause methane slip in natural gas fueled dual fuel engines (e.g., direct combustion short circuit, piston/cylinder wall crevice region quench, bulk flame quench). The systems and methods described in this document control the combustion of ammonia in dual fuel applications such that NOx emissions and ammonia slip ($NH_3$) are both controllably reduced or eliminated. While discussed with respect to diesel dual fuel applications herein, the same concepts can be applied to other dual fuel applications combusting ammonia.

Figure 1:
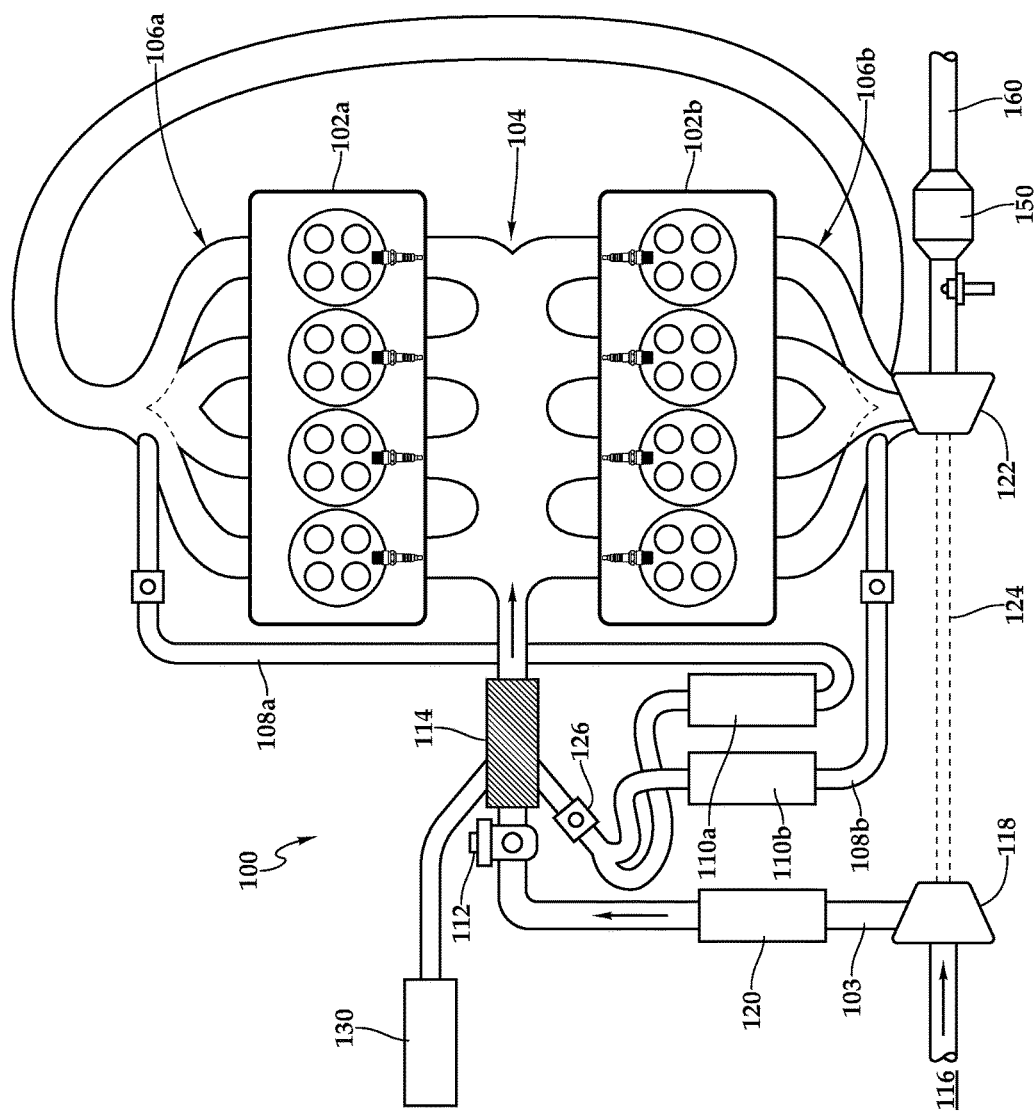
FIG. 1 is a schematic diagram of an example internal combustion engine system.

FIG. 1 shows an example engine system 100. The engine system 100 includes an intake manifold 104 fluidically coupled to a source of oxygen (e.g., air) that is combined with diesel fuel (e.g., by direct injection) and ammonia fuel (e.g., by port or direct injection). The engine system 100 is configured as a four-stroke (e.g., intake, compression, combustion, exhaust) engine. The engine system 100 includes a cylinder bank 102a having four cylinders and a cylinder bank 102b having four cylinders. While the illustrated implementation includes an eight-cylinder engine having two banks of four cylinders, the engine system 100 can have any appropriate number of banks having any appropriate number of cylinders. Also, while the illustrated example is depicted and described as a piston engine, aspects of this disclosure can be applied to other types of internal combustion engines, such as rotary engines.

In certain instances, a throttle 112 is positioned in an intake plenum 103 upstream of the intake manifold 104 to regulate pressure in the intake manifold 104, for example, for control of exhaust gas recirculation (EGR).

An exhaust manifold 106a is configured to receive combustion products (exhaust) from a combustion chamber of the cylinder bank 102a. That is, the exhaust manifold 106a is fluidically coupled to outlets of the combustion chambers of the cylinder bank 102a. An EGR flow passage 108a or conduit fluidically connects the exhaust manifold 106a and an ammonia gas injector 114 configured to provide ammonia gas fuel to the intake manifold 104 (e.g., port injection of ammonia gas fuel). In some implementations, the ammonia gas injector 114 may be configured as a direct injection system configured to deliver ammonia gas fuel directly into the combustion chambers. In the illustrated implementation, an EGR throttle valve 126a is located within the gas flow passage 108a between the exhaust manifold 106a and the ammonia gas injector 114 and is used to regulate the EGR flow. In certain instances, an exhaust gas cooler 110a is positioned in the EGR flow passage 108a between the exhaust manifold 106a and the ammonia gas injector 114. The exhaust gas cooler 110a can operate to lower a temperature of the exhaust gas prior to entering the ammonia gas injector 114. The exhaust gas cooler 110a is a heat exchanger, such as an air-air exchanger or an air-water exchanger. In some implementations the EGR flow may be recirculated to the intake manifold 104 at upstream from, downstream from, or at the ammonia gas injector 114, An exhaust manifold 106b is configured to receive combustion products (exhaust) from a combustion chamber of the cylinder bank 102b. That is, the exhaust manifold 106b is fluidically coupled to outlets of the combustion chambers of the cylinder bank 102b. An EGR flow passage 108b or conduit fluidically connects the exhaust manifold 106b and the intake manifold 104. In the illustrated implementation, an EGR throttle valve 126b is located within the EGR flow passage 108b between the exhaust manifold 106b and the ammonia gas injector 114 and is used to regulate the EGR flow. The EGR throttle valve 126b regulates the EGR flow by adjusting a cross-sectional area of the EGR flow passage 108b going through the EGR throttle valve 126b.

An exhaust gas cooler 110b is positioned in the EGR flow passage 108b between the exhaust manifold 106b and the ammonia gas injector 114. The exhaust gas cooler 110b can operate to lower a temperature of the exhaust gas prior to entering the ammonia gas injector 114. The exhaust gas cooler 110b is a heat exchanger, such as an air-air exchanger or an air-water exchanger.

In some implementations, the engine system 100 includes a compressor 118 upstream of the throttle 112. In an engine with a compressor 118 but no throttle, such as an unthrottled diesel engine, the throttle 112 is not needed and the ammonia gas injector 114 can be down stream of the compressor 118.

The compressor 118 can include a centrifugal compressor, a positive displacement compressor, or another type of compressor for increasing a pressure within the air in the intake plenum 103 during engine operation.

In the illustrated example, the compressor 118 is a part of a turbocharger. That is, a turbine 122 is located downstream of the exhaust manifolds 106a and 106b and rotates as the exhaust gases expand through the turbine 122. The turbine 122 is coupled to the compressor 118, for example, via a shaft and imparts rotation on the compressor 118. While the illustrated example depicts and describes a turbocharger to increase the intake manifold pressure, other methods of compression can be used, for example an electric or engine powered compressor (e.g., supercharger).

The engine system 100 includes an intercooler 120 that is configured to cool the compressed air in the intake plenum 103 prior to the air entering the ammonia gas injector 114 and the intake manifold 104. The intercooler can operate to lower a temperature of the compressed air prior to the intake manifold 104. The intercooler is a heat exchanger, such as an air-air exchanger or an air-water exchanger.

A fuel supply 130 is configured to provide fuel for combustion in the engine system 100 (e.g., in the cylinders of the cylinder blocks 102a and 102b). In the illustrated example, the fuel supply 130 is configured to supply ammonia gas as a fuel to the ammonia gas injector 114. An example of such a configuration is discussed in more detail in the description of FIG. 2. In some embodiments, the fuel supply 130 can be configured to supply fuel to the intake plenum 103 (e.g., upstream of the throttle 112). In some embodiments, the fuel supply 130 can be configured to supply fuel downstream from the ammonia gas injector 114 (e.g., to the intake manifold 104, through direct injection into the cylinders).

In some embodiments, the fuel supply 130 can be a high-pressure fuel supply. For example, the fuel supply can be configured to provide pressurized gaseous ammonia, hydrogen, methane, or any other appropriate combustible gas. In another example, the fuel supply can be configured to provide liquefied ammonia, hydrogen, methane, or any other appropriate combustible gas that can be stored and/or provided in a liquefied form.

An exhaust after-treatment system 150 (e.g., a catalytic converter) is coupled to the exhaust manifolds 106a and 106b and configured to reduce the amounts of regulated emissions that exit a tailpipe 160. An example of an exhaust after-treatment system will be discussed further in the description of FIG. 9.

Lean fuel-air mixtures are used in many of today's internal combustion engines to reduce regulated emissions, and recent reductions in emission regulations are pushing NOx limits to the lower limits of 1, ½, ¼ and ⅛ TA Luft, (where 1 TA Luft=1.0 gm/kw-hr of NOx emissions. One challenge is that as fuel quality and atmospheric conditions change, an engine controller can have a hard time maintaining proper air/fuel ratio (AFR richer than is needed). Additionally, fuel injectors are prone to wear and eventually cause variations in their operational performance.

Currently, combustion monitoring via cylinder pressure is used to develop engine combustion strategies and their control on nearly all engines in the research and development environment. However, cylinder pressure based monitoring systems on production engines remain underdeveloped and short on capability due to the low speed processors generally available in current production ECUs, and they are expensive and unreliable, thus limiting their applicability to only the highest power density and highest efficiency applications where their benefits can be justified against their cost. With new emerging ECU capability and more reliable pressure sensors, it is anticipated that widespread adoption of pressure sensing is imminent. However, once ECU capability and sensor reliability achieve their targets, their remains the need for "efficient and meaningful algorithms." In this disclosure, an example of one such efficient and meaningful algorithm is identified—that being the ability to control fuel delivery and combustion to control and ultimately reduce or eliminate NOx and $NH_3$ exhaust emissions. Some example methods described herein are able to control combustion by sampling cylinder pressure during each combustion event and delivering precisely timed pulses of fuel accordingly. Within this embodiment, the detection information is immediately transferred to the ECU to take corrective action.

Some of the concepts described herein encompass controlling an engine using in-cylinder pressure measurements processed by an engine control unit (ECU). Concepts disclosed herein can provide an ability to control combustion and/or emissions without the need for a high power processor, and in certain instances, without requiring a separate higher power ECU for processing the pressure signals into combustion metrics, such as heat release derived parameters, that resides apart from the ECU for determining and controlling the ignition timing and fueling. Using in-cylinder pressure measurements can, in some instances, eliminate the need for using multiple other sensors for engine control, for example, eliminating the need for a mass-air-flow sensor, NOx (oxides of nitrogen) sensor, knock sensor or exhaust temperature sensor. Moreover, in certain instances, the concepts herein enable better adapting to variations in fuel quality (e.g., variations in energy content (MBTU/m3)).

The ECU has an embedded processor with, in certain instances, the capability to process high-speed cylinder pressure data with resolution as fine as 0.25° crank and capable of producing a comprehensive suite of diagnostics for monitoring cylinder pressure, as well as, filtering and averaging combustion diagnostics in real-time, i.e., concurrent with the engine operation and current enough for use in a control loop for controlling the engine. In some instances, the processing and control is done within a single cycle of each cylinder. In some instances, the ECU is capable of processing up to 20 cylinders in real-time with the total processing time for each cylinder of around 2.5 milliseconds. The real-time combustion metrics calculated by the ECU, in certain instances, include location, in crank angle or time, of peak pressure (Ploc) and maximum pressure (Pmax), and pressure at any specific fixed crank angle or volume within one or more the cylinders.

Prior art embedded pressure monitoring systems can be found in closed-loop control on a modern four-cylinder, reciprocating diesel engine, in both a conventional dual-fuel natural gas-diesel mode, and a Reactive Controlled Compression Ignition, or RCCI, gas-diesel mode—in a research lab environment. However, these concepts are not general and are not well applicable to any other engine configurations such as those with fewer or more cylinders, different fuel types, and to other, non-reciprocating types of engines. Concepts disclosed herein go beyond the research lab environment to be made practical in an embedded ECU.

According to the concepts herein, combustion is able to be controlled on a per cylinder and per engine cycle basis by monitoring engine cylinder pressure and monitoring engine shaft position (e.g., with a crank angle sensor and/or in another manner), smoothing and averaging the in-cylinder pressure at locations before and after an ignition event representing equal combustion chamber volumes (e.g., the same cylinder location before and after TDC), and comparing the difference between the before and after averaged pressure to a predetermined threshold value from the particular volumes measured that indicates negative combustion quality. In some instances, cylinder pressure that is measured in a compression and/or combustion stroke can be used by the ECU to modify fuel timing and delivery in a subsequent compression and/or combustion stroke (e.g., the following cycle).

In some instances, the sensed pressure is processed using vector central average smoothing prior to use in an algorithm for the determination of inadequate combustion events. According to the embodiments herein, algorithms compare the exhaust stroke pressure against the compression stroke pressure at the same cylinder volume (referring to the P-V diagram) (typically, but not necessarily, the equal volume states can be characterized as equal absolute value of the engine crank angle relative to TDC (e.g., smoothed pressure at 90° after TDC on the exhaust stroke compared to 90° before TDC on the compression stroke and/or in another manner.)

According to the embodiments herein, calculation of the pressure difference between expansion stroke and compression stroke is input to an algorithm used to determine if each combustion event is "ok" or "not ok."

Some aspects of the embodiments herein include a method using continuous monitoring of cylinder pressure for each cylinder. The method compares the pressure on the combustion stroke to the pressure on the compression stroke at the same engine crank angle. Aspects of the embodiments herein include a method selecting 1-5 key crank angles for comparison. In some instances, the key crank angles are preset and, in some instances, the key crank angles are varied during operation. Aspects of the embodiments herein include using appropriate smoothing and averaging of the pressure signal to reduce the effects of noise on the pressure trace. Aspects of the embodiments herein include, once an inadequate combustion event is detected by the ECU, triggering an alarm state signal that is available to the main ECU or main engine control algorithms that can shut-off fuel and ignition firing to protect the engine and avoid engine ignited exhaust explosions.

In some instances, the concepts herein encompass dual-fuel diesel-ammonia gas engines that employ cylinder pressure monitoring to determine the IMEP and center of combustion (CA50) as primary methods based upon new capabilities, such as heat release, while also being able to monitor and control on more conventional pressure only methods such as the magnitude and location of peak pressure and adjust ignition and fueling to balance the cylinders, while safely keeping the peak pressure below the engine design limits. One such in-cylinder pressure measure and combustion metric calculation system is disclosed in U.S. application Ser. No. 15/099,486, titled "Combustion Pressure Feedback Based Engine Control with Variable Resolution Sampling Windows." Combustion parameters such as location of start of combustion (SOC or CA10), center of combustion (CA50), the rate of pressure rise (RPR), and maintaining Pmax below the engine limit can be calculated, provided to the engine controller and subsequently controlled.

In conventional ECU system, in some instances, due to memory and processor limitations, the analysis of a pressure trace can be limited to information customized to work directly with the engine control strategy and the processor for determining the combustion metrics is embedded in the same device as the remainder of the engine control unit. In a memory or processor limited implementation, the conventional ECU system selects only a small subset of the combustion metrics and uses surrogate analyses that are useful only for a one of a kind pre-designed engine control objective; they are not general.

In some examples of the present ECU system, it converts high-speed cylinder pressure data into meaningful low speed data that informs the user of the engine operating conditions (e.g., adequate or inadequate combustion) within a small number of engine cycles, even within a single cycle, and provides stable and reliable smart sensor input to the ECU to deliver the following benefits. In some instances, the pressure data supplied to the ECU system also enables engine protection via appropriate actuator changes to provide over-pressure protection (Pmax), pressure rise rate protection (RPR), and knock detection. In some instances, the ECU system calculates combustion quality metrics to determine the above actuator changes (e.g. ignition timing, in-cylinder injection and port injection timing and duration, AFR control, and throttle position).

In some examples, a system is built into an embedded controller that communicate with the main controller directly or over a controller area network (CAN) link, and without significant time lag. Alternatively, in some instances, one or more of the combustion quality detection methods described above are performed directly on the main processor of the ECU, assuming adequate computational power is available.

In some instances, the engine control device is configured to improve knock margin in ammonia engines, improve maximum ammonia-to-diesel substitution rates in an ammonia-diesel dual-fuel application, and enable precise control of combustion phasing of a low temperature combustion (LTC) strategy such as homogenous charge compression ignition (HCCI), reactivity controlled compression ignition (RCCI), and premixed charge controlled ignition (PCCI), all within the engine protection limits and improve efficiency at equal emissions or engine reliability.

Figure 2:
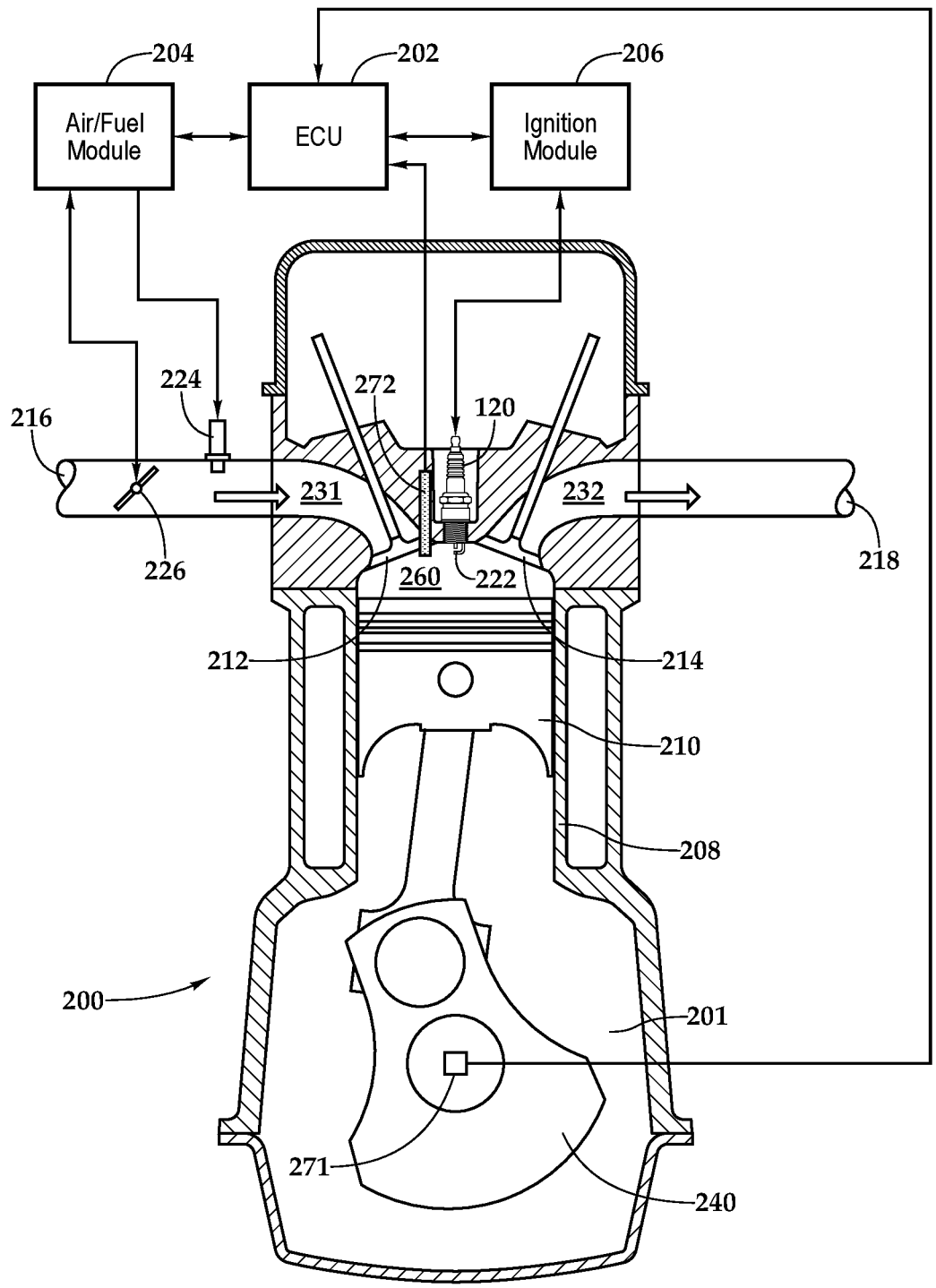
FIG. 2 is a schematic of a cross-sectional view of a cylinder of an internal combustion engine including an engine control system.

Referring initially to FIG. 2, an engine system 200 exemplifying the present system is shown. In some embodiments, the engine system 200 can be the example engine system 100 of FIG. 1. The engine system 200 includes an engine control unit 202, an air/fuel module 204, an ignition module 206, and an engine 201 (shown here as a reciprocating engine). FIG. 2 illustrates, for example, an internal combustion engine 200. For the purposes of this disclosure, the engine system 200 will be described as a gaseous-fueled reciprocating piston engine. In certain instances, the engine operates on ammonia fuel. The engine may be any other type of combustion engine, both in the type of fuel (gaseous (e.g., ammonia, natural gas, hydrogen), liquid (e.g., gasoline, diesel, and/or other), same phase or mixed phase multi-fuel, and/or another configuration) and the physical configuration of the engine (e.g., reciprocating, Wankel rotary, and/or other configuration). While the engine control unit 202, the air/fuel module 204 and the ignition module 206 are shown separately, the modules 202, 204, 206 may be combined into a single module or be part of an engine controller having other inputs and outputs.

The reciprocating engine 201 includes engine cylinder 208, a piston 210, an intake valve 212, and an exhaust valve 214. The engine 201 includes an engine block that includes one or more cylinders 208 (only one shown in FIG. 2). The engine 200 includes a combustion chamber 260 formed by the cylinder 208, the piston 210, and a head 230. An ignition device 220 is positioned within the head 230, which enables the ignition device 220 access to the combustible mixture. In general, the term "ignition device" can refer to a direct fuel injection device and/or spark plug or other ignition device within a prechamber. In the case of a spark plug, a spark gap 222 of the spark plug 220 is positioned within the combustion chamber 260. Other types of igniters can be used, including compression ignition, laser igniters, hot surface igniters, and/or yet other types of igniters. The piston 210 within each cylinder 208 moves between a top-dead-center (TDC) position and a bottom-dead-center (BDC) position to compress a charge of a combustible mixture as a gas or gas/liquid mixture in a compression phase and movable from the center position by expanding combustion gasses in an expansion phase. The engine 200 includes a crankshaft 240 that is connected each piston 210 such that the piston 208 moves between the TDC and BDC positions within each cylinder 208 and rotates the crankshaft 240. The TDC position is the position the piston 210 with a minimum volume of the combustion chamber 260 (i.e., the piston's 210 closest approach to the spark plug 220 and top of the combustion chamber 260), and the BDC position is the position of the piston 210 with a maximum volume of the combustion chamber 260 (i.e., the piston's 210 farthest retreat from the ignition device 220 and top of the combustion chamber 260).

The cylinder head 230 defines an intake passageway 231 and an exhaust passageway 232. The intake passageway 231 directs air or an air and fuel mixture from an intake manifold 216 into combustion chamber 260. The exhaust passageway 232 directs exhaust gases from combustion chamber 260 into an exhaust manifold 218. The intake manifold 216 is in communication with the cylinder 208 through the intake passageway 231 and intake valve 212. The exhaust manifold 218 receives exhaust gases from the cylinder 208 via the exhaust valve 214 and exhaust passageway 232. The intake valve 212 and exhaust valve 214 are controlled via a valve actuation assembly for each cylinder, which may include be electronically, mechanically, hydraulically, or pneumatically controlled or controlled via a camshaft (not shown).

Movement of the piston 210 between the TDC and BDC positions within each cylinder 208 defines an intake stroke, a compression stroke, a combustion or power stroke, and an exhaust stroke. The intake stroke is the movement of the piston 210 away from the ignition device 220 with the intake valve 212 is open and a fuel/air mixture being drawn into the combustion chamber 260 via the intake passageway 231. The compression stroke is movement of the piston 210 towards the ignition device 220 with the air/fuel mixture in the combustion chamber 260 and both the intake value 212 and exhaust valve 214 are closed, thereby enabling the movement of the piston 210 to compress the fuel/air mixture in the combustion chamber 260. The combustion or power stroke is the movement of the piston 210 away from the ignition device 220 that occurs after the combustion stroke when the combustible air/fuel mixture is ignited. The ignited fuel/air mixture combusts and rapidly raises the pressure in the combustion chamber 260, applying an expansion force onto the movement of the piston 210 away from the ignition device 220. The exhaust stroke is the movement of the piston 210 towards the ignition device 220 after the combustion stroke and with the exhaust valve 214 open to allow the piston 210 to expel the combustion gases to the exhaust manifold 218 via the exhaust passageway 218.

The engine 200 includes a fueling device 224, such as a fuel injector, gas mixer, or other fueling device, to direct ammonia fuel into the intake manifold 216 or directly into the combustion chamber 260. In some instances, the engine system 200 could include another type of internal combustion engine 201 that does not have pistons/cylinders, for example, a Wankel engine (i.e., a rotor in a combustion chamber).

During operation of the engine, i.e., during a combustion event in the combustion chamber 260, the air/fuel module 204 supplies ammonia fuel to a flow of incoming air in the intake manifold before entering the combustion chamber 260. The ignition module 206 controls the ignition of the air/fuel in the combustion chamber 260 by regulating the timing of the injection of diesel fuel into the combustion chamber 260, which initiates combustion of the fuel/air mixture within combustion chamber 260 during a series of ignition events between each successive compression and combustion strokes of the piston 210. During each ignition event, the ignition module 206 controls ignition timing and provides power to the ignition device 220. The air/fuel module 204 controls the fuel injection device 224 and may control throttle valve 226 to deliver air and fuel, at a target ratio, to the engine cylinder 208. The air/fuel module 204 receives feedback from engine control module 202 and adjusts the air/fuel ratio. The ignition module 206 controls the ignition device 220 by controlling the flow of electric current from a power source (e.g., alternator, battery). The ECU 202 regulates operation of the ignition module 206 based on the engine speed and load and in addition to aspects of the present system disclosed below.

In some instances, the ECU 202 includes the ignition module 206 and the fuel/air module 204 as an integrated software algorithms executed by a processor of the ECU 202, and thereby operate of the engine as single hardware module, in response to input received from one or more sensors (not shown) which may be located throughout the engine. In some instances, the ECU 202 includes separate software algorithms corresponding to the described operation of the fuel/air module 204 and the ignition module 206. In some instances, the ECU 202 includes individual hardware module that assist in the implementation or control of the described functions of the fuel/air module 204 and the ignition module 206. For example, the ignition module 206 of the ECU 202 may include an ASIC to regulate electric current delivery to the ignition device 220. A plurality of sensor systems exist to monitor the operational parameters of an engine 200, which may include, for example, a crank shaft sensor, an engine speed sensor, an engine load sensor, an intake manifold pressure senor, an in-cylinder pressure sensor, etc. Generally, these sensors generate a signal in response to an engine operational parameter. For example, a crankshaft sensor 271 reads and generates a signal indicative of the angular position of crankshaft 240. In an exemplary embodiment, a high speed pressure sensor 272 measures in-cylinder pressure during operation of the engine 200. The sensors 271, 272 may be directly connected to the ECU 202 to facilitate the sensing, or, in some instances are integrated with a real-time combustion diagnostic and control (RT-CDC) unit configured to acquire high-speed data from one or more of the sensor and provide a low speed data output to the ECU 202. In some instances, the ignition control described herein is a stand-alone ignition control system providing the operation of ECU 202 and the ignition module 206. The sensors may be integrated into one of the control modules, such as the ECU 202 or a RT-CDC. Other sensors are also possible, and the systems described herein may include more than one such sensor to facilitate sensing the engine operational parameters mentioned above.

Figure 3:
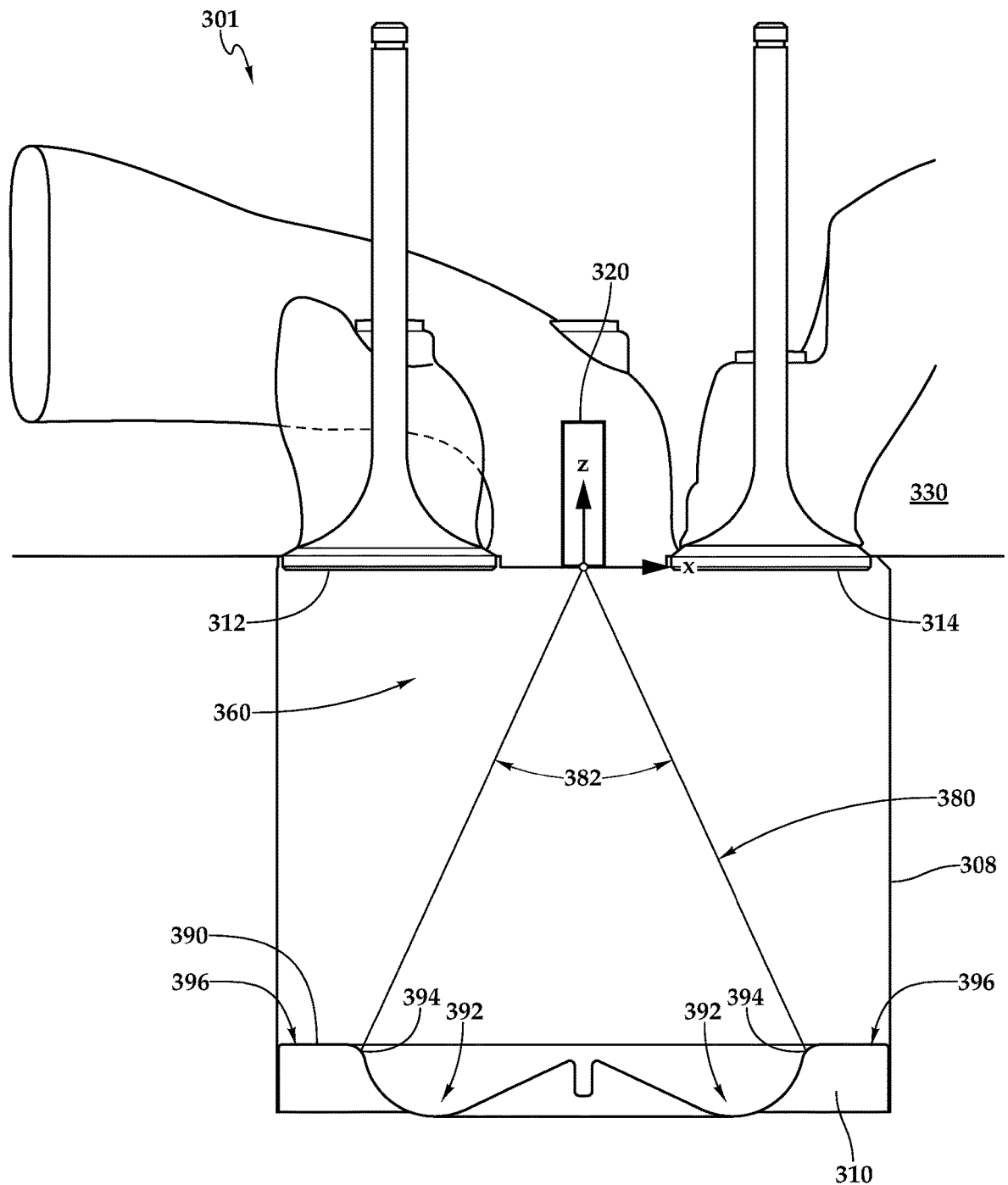
FIG. 3 is a cross-sectional view of another cylinder of an internal combustion engine.

FIG. 3 is an enlarged cross-sectional view of a cylinder 308 of an internal combustion engine 301. In some embodiments, the engine 301 can be a modification of the example engine 201 of FIG. 2.

The engine 301 includes engine cylinder 308, a piston 310, an intake valve 312, and an exhaust valve 314. The engine 301 includes an engine block that includes one or more cylinders 308 (only one shown in FIG. 3). The engine 301 includes a combustion chamber 360 formed by the cylinder 308, the piston 310, and a head 330.

A port fuel injector (not shown) provides ammonia gas fuel to an intake plenum 313 upstream from the cylinder 308. A direct fuel injector 320 is positioned within the head 330 to provide diesel fuel for combustion. In some embodiments, such as when direct injection is used instead of port injection, the direct fuel injector 320 can also include a direct injector for ammonia fuel. The piston 310 within each cylinder 308 moves between a top-dead-center (TDC) position and a bottom-dead-center (BDC) position. The piston 308 moves between the TDC and BDC positions within each cylinder 308 and rotates a crankshaft. The TDC position is the position the piston 310 with a minimum volume of the combustion chamber 360 (i.e., the piston's 310 closest approach to the direct fuel injector 320 and top of the combustion chamber 360), and the BDC position is the position of the piston 310 with a maximum volume of the combustion chamber 360 (i.e., the piston's 310 farthest retreat from the spark plug 320 and top of the combustion chamber 360).

The piston 310 has a face 390. A piston bowl 392 having a predetermined shape is defined in the piston 310 and is open at the face 390. A shoulder 394 is defined at the border between the piston face 390 and the piston bowl 392. A crevice 396 is defined between the piston 310 and the cylinder 308.

The direct fuel injector 320 is configured to spray a conical jet 380 of fuel (e.g., diesel) into the combustion chamber 360. The direct fuel injector 320 is configured such that the conical jet 380 disperses in an angle 382 of about 50° to about 70°, which is different from traditional spray patterns that generally have dispersal angles of 120°-140°. In some embodiments, the direct fuel injector 320 can include one or more than one nozzle (e.g., 4-8 individual nozzles) configured to spray diesel fuel into the combustion chamber 360. In some embodiments, the conical jet 380 may be provided by multiple injector nozzles, with each of the multiple nozzles configured to spray a portion of the conical jet 380.

The conical jet 380 is configured to direct fuel toward the shoulder 394 when the piston is at a predetermined position during the compression stroke. In some embodiments, fuel impingement on the shoulder 394 can improve diesel particle distribution. For example, diesel particles in crevice regions can help to combust ammonia on the crevice regions and can reduce ammonia slip (e.g., by having combustion initiation starting from diesel vapor that results from vaporized diesel droplets in the crevice regions). In another example, diesel particles on the piston bowl 392 can help improve combustion speed, for example, by seeding a low reactivity ammonia-air mixture with high reactivity diesel vapor. In another example, injection time and the angle 382 can be configured to bring the resulting air/fuel mixture near to mixture auto-ignition conditions at TDC. In another example, the auto ignition can be controlled with injection time; early injection can allow the diesel droplets to evaporate and mix with ammonia, late injection can provide a more stratified lambda. During compression, the diesel droplets vaporize and that vapor mixes with air to provide a spectrum of air-fuel mixtures (e.g., lambda distribution) where the zones that are most likely to ignite will be near stoichiometric (e.g., lambda 1.0) and surrounded by other regions that are too rich or are too lean. If early injection is used, then the domination will be towards well mixed and thus lean, whereas later injection will cause more zones that are not well mixed (e.g., stratified) and more likely to auto-ignite. In another example, the ignition and the angle 382 can be configured such that the engine 301 can run at high compression ratios and high efficiency.

Figure 4:
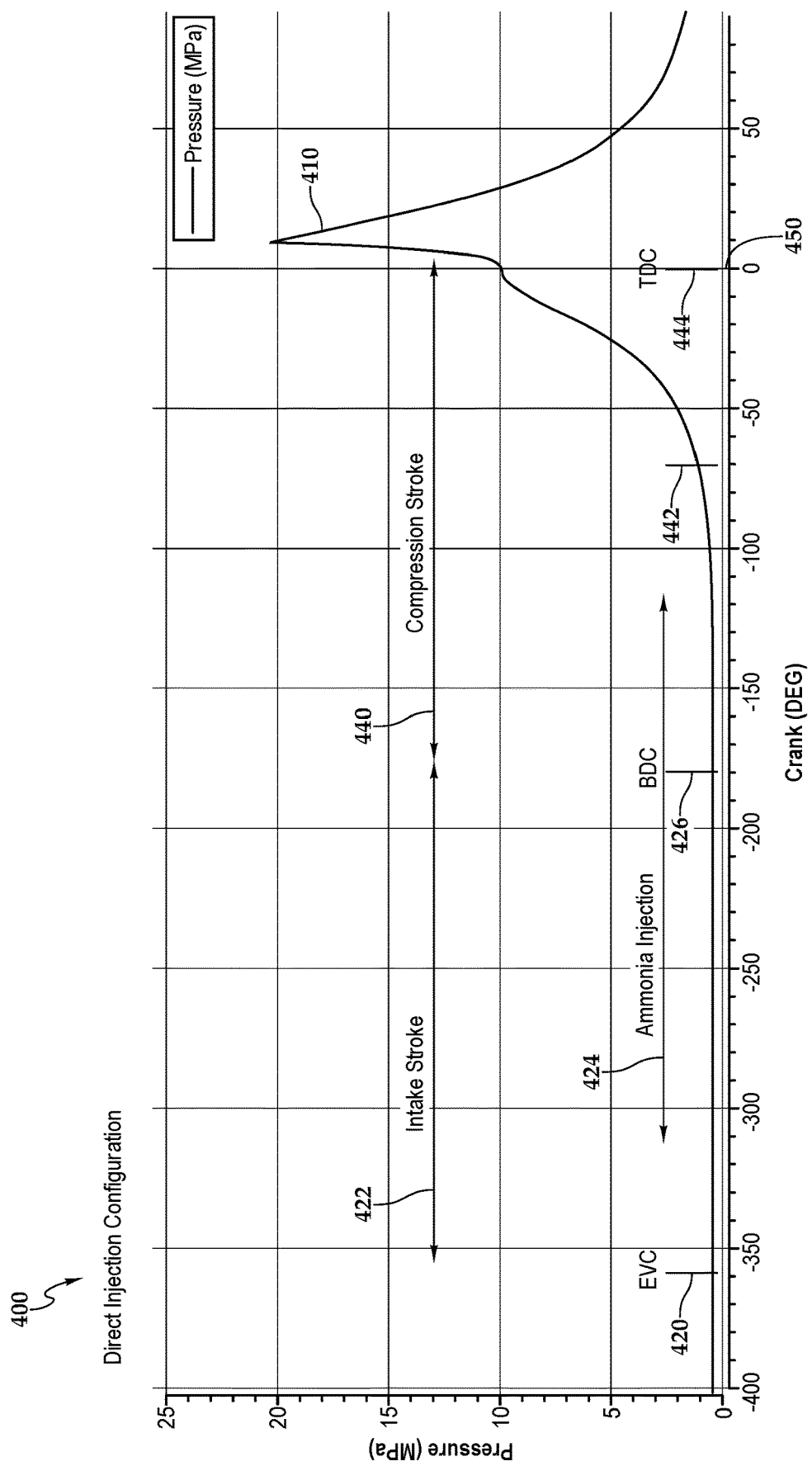
FIGS. 4 and 5 show charts of example cylinder strokes.

FIG. 4 shows a chart 400 of an example cylinder stoke. The chart 400 shows a line 410 that represents an example of combustion chamber pressure over crank angle for an engine that is configured to use direct injection of ammonia fuel and diesel fuel. In some embodiments, the chart 400 can represent an example of cylinder pressures in the example engine system 100 of FIG. 1, the example engine system 200 of FIG. 2, or the example engine 301 of FIG. 3.

At a crank angle of about −360° before top dead center (TDC), exhaust valve closing (EVC) 420 occurs and an intake stroke 422 begins. The pressure 410 remains low as air is drawn into the cylinder. At a crank angle of about −320°, ammonia injection 424 begins. Bottom dead center (BDC) 426 occurs at −180°, ending the intake stroke 422 and starting a compression stroke 440. Intake valve closing (IVC) also occurs near BDC to substantially seal the compression chamber.

Once the compression stroke 440 begins, the pressure 410 begins to rise slowly. At a predetermined crank angle (e.g., about −70° in the illustrated example) a first pulse 442 of diesel fuel is injected into the combustion chamber to prepare an air/fuel mixture that is near auto-ignition. In some embodiments, the timing and/or placement of the first pulse 442 can be based on variable inputs, such as the pressure 410 (e.g., measured by the example high speed in-cylinder pressure sensor 272), measured air pressure/density, measured air temperature, fuel parameters, and combinations of these and/or any other appropriate variable or parameter that can affect combustion. In some implementations, the predetermined crank angle can be based on operational parameters of the engine, such as engine load, engine speed, or combinations of these and any other appropriate operational conditions of the engine.

As the compression stroke 440 continues, the pressure 410 continues to rise. At a predetermined crank angle (e.g., about −8° in the illustrated example, and/or can be a function of engine load and/or speed) a second pulse 444 of diesel fuel is injected into the combustion chamber to start combustion and to control CA50 (e.g., the crank angle at which 50% of combustion has occurred), CA10 (e.g., the start of combustion), and/or a $NH_3/NOx$ ratio in the combustion cycle. In some embodiments, the timing and/or placement of the second pulse 444 can be based on variable inputs, such as the pressure 410 (e.g., measured by the example high speed pressure sensor 272), measured air pressure/density, measured air temperature, fuel parameters, and combinations of these and/or any other appropriate variable or parameter that can affect combustion. In some implementations, changing combustion phasing (e.g., characterized by either CA10 or CA50) can change the ratio of $NH_3/NOx$ coming out of the engine. In some embodiments, such functionality could be implemented with the use of feedback mechanism to monitor catalyst out NOx or $NH_3$ and adjust the combustion phasing accordingly to achieve the target ratio.

The compression stroke 440 ends at TDC 450 (e.g., 0°). In some implementations, selective catalytic reduction (SCR) can be used to reduce NH$_3$, so the ratio of NH$_3$/NOx can be kept slightly above unity (e.g., >1 (plus or minus about 0.3), about 1 to about 1.2).

In some implementations, the predetermined crank angles can be based on operational parameters of the engine, such as engine load, engine speed, or combinations of these and any other appropriate operational conditions of the engine. In some implementations, crank angles, fuel delivery settings, and cylinder pressures used and identified in a combustion cycle can be processed to modify the crank angles and fuel delivery settings used in a subsequent (e.g., next) combustion cycle).

Figure 5:
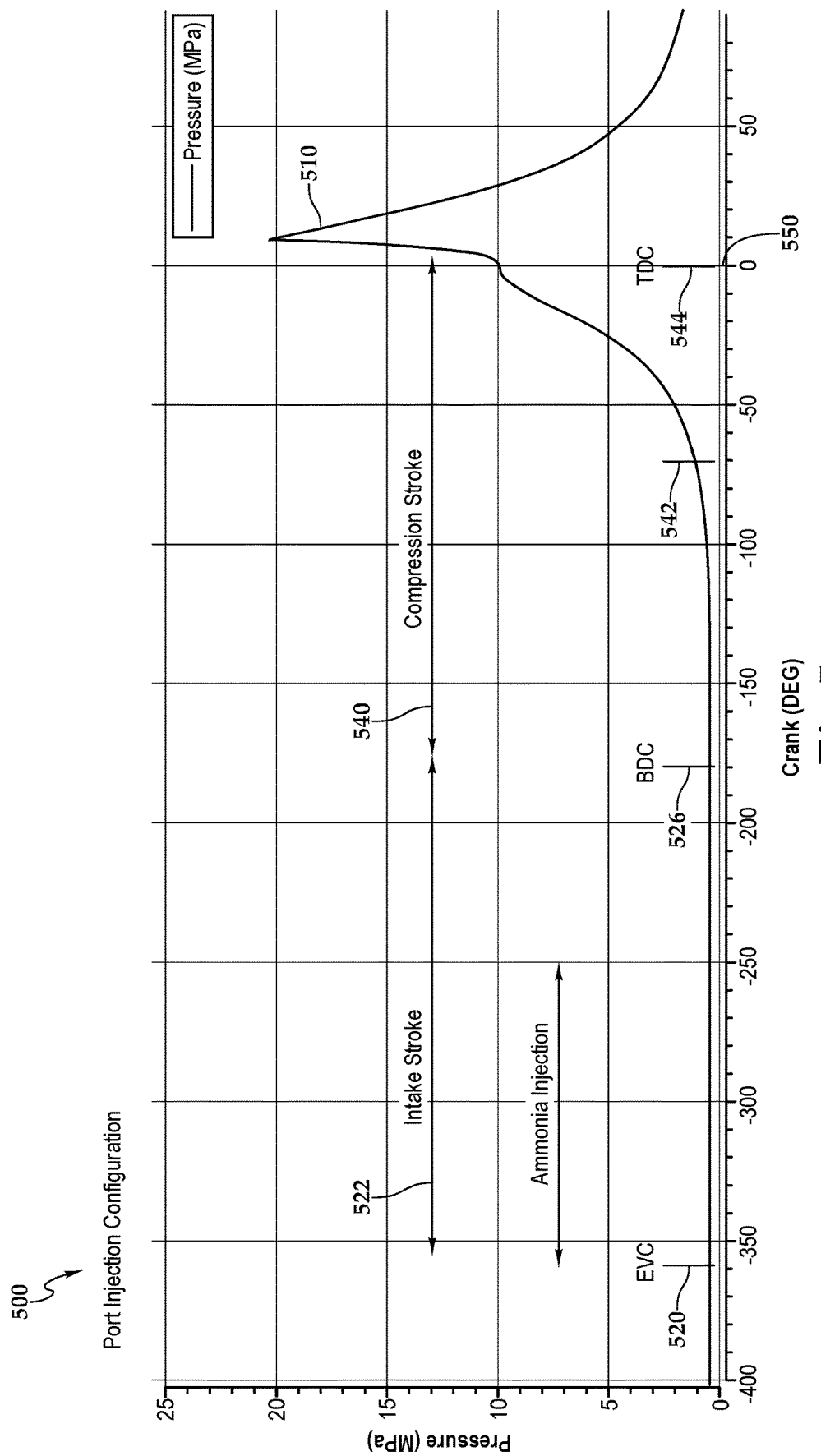

FIG. 5 shows a chart 500 of an example cylinder stoke. The chart 500 shows a line 510 that represents an example of combustion chamber pressure over crank angle for an engine that is configured to use port injection of ammonia gas fuel. In some embodiments, the chart 500 can represent an example of cylinder pressures in the example engine system 100 of FIG. 1, the example engine system 200 of FIG. 2, or the example engine 301 of FIG. 3.

At a crank angle of about −360° before TDC, exhaust valve closing (EVC) 520 occurs and an intake stroke 522 begins. The pressure 510 remains low as air is drawn into the cylinder. At a crank angle of about −320°, ammonia injection 524 begins. BDC 526 occurs at −180°, ending the intake stroke 522 and starting a compression stroke 540. IVC also occurs near BDC to substantially seal the compression chamber.

Once the compression stroke 540 begins, the pressure 510 begins to rise slowly. At a predetermined crank angle (e.g., about −70° in the illustrated example) a first pulse 542 of diesel fuel is injected into the combustion chamber to prepare an air/fuel mixture that is near auto-ignition. In some embodiments, the timing and/or placement of the first pulse 542 can be based on variable inputs, such as the pressure 510 (e.g., measured by the example high speed pressure sensor 272), measured air pressure/density, measured air temperature, fuel parameters, and combinations of these and/or any other appropriate variable or parameter that can affect combustion. In some implementations, the predetermined crank angle can be based on operational parameters of the engine, such as engine load, engine speed, or combinations of these and any other appropriate operational conditions of the engine.

As the compression stroke 540 continues, the pressure 510 continues to rise. At a predetermined crank angle (e.g., about −8° in the illustrated example, and/or can be a function of engine load and/or speed) a second pulse 544 of diesel fuel is injected into the combustion chamber to start combustion and to control CA50 and a NH$_3$/NOx ratio in the combustion cycle. In some embodiments, the timing and/or placement of the second pulse 544 can be based on variable inputs, such as the pressure 510 (e.g., measured by the example high speed pressure sensor 272), measured air pressure/density, measured air temperature, fuel parameters, and combinations of these and/or any other appropriate variable or parameter that can affect combustion.

The compression stroke 540 ends at TDC 550 (e.g., 0°). In some implementations, selective catalytic reduction (SCR) can be used to reduce NH$_3$, so the ratio of NH$_3$/NOx can be kept slightly above unity (e.g., >1, about 1 to about 1.2).

In some implementations, the predetermined crank angles can be based on operational parameters of the engine, such as engine load, engine speed, or combinations of these and any other appropriate operational conditions of the engine. In some implementations, crank angles, fuel delivery settings, and cylinder pressures used and identified in a combustion cycle can be processed to modify the crank angles and fuel delivery settings used in a subsequent (e.g., next) combustion cycle).

Figure 6:
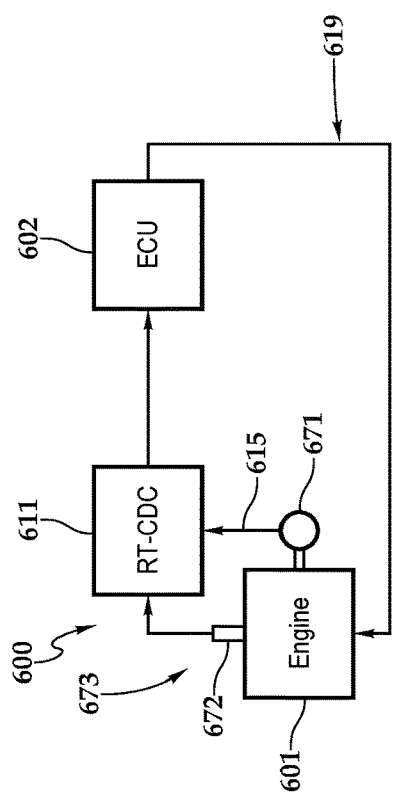
FIG. 6 is a schematic of an example engine control system.

FIG. 6 is a schematic of an example engine control system 600. In some embodiments, the engine control system 600 can be all or part of the example engine control system 202 of FIG. 2. FIG. 6 shows an ECU 602 within the engine control system 600 configured to control an engine 601. As indicated above, high-speed pressure data 672 is generated by pressure sensors 672, each mounted with direct access to the combustion chamber. The pressure signal 673 is captured at a high crank-synchronous rate, for example, 0.25° resolution or 2880 samples per cycle of the engine 601. In some embodiments, this synthetic crank angle signal can be generated from a lower resolution crank position signal. For example, with a typical crank angle encoder 671 generating a crank angle signal 615 by sensing passage of the edge of teeth on a disk, the disk mounted to rotate with the crank, the resolution of the crank position is based on the number of teeth. A typical 60-2 tooth wheel has a resolution of 6°. However, in some instances, interpolation can be used to determine a crank angle in the space between of the edges. Thus, the spacing between edges can use the previously observed tooth period divided by the number of edges required to achieve the desired angular sampling resolution. To account for minor variability between the crank teeth that can be seen even when the average engine speed is constant, and the encoder system can be re-synchronized on each edge.

In some instances, the resulting high-resolution pressure signal 673 can be used by a combustion analysis routine in the ECU 602 to produce the combustion analysis 619 on a per-cylinder, per cycle basis, for example, IMEP, Pmax, CA50, NOx emissions, NH$_3$ emissions, and combustion quality (e.g., good fire, poor fire, misfire). The metrics 619 are subsequently used by the ECU 102 as a feedback signal for adjusting key combustion performance characteristics by modulating engine control actuator settings 619. In an exemplary embodiment, the crank angle signal 615 is used to analyze the pressure signal 673 at crank angles before TDC and after TDC (e.g., two equal main combustion chamber volumes) during each combustion event, and, based on a comparison of the difference between the two pressure signals to a threshold value associated with the sampled crank angle or range of crank angles, determine if a combustion event in the main combustion chamber of the engine 601 exhibits poor fire or misfire.

In conventional (non-LTC) dual-fuel operation, combustion phasing is a critical factor for efficiency, emissions, and knock margin. Good control of combustion phasing can significantly improve the maximum gas substitution rate. As not all variables in the engine can be held to tight tolerances (including manifold absolute temperature (MAT), manifold absolute pressure (MAP), and injection rail pressure for example), typical open-loop methods of controlling combustion phasing can be significantly enhanced by some feedback mechanism.

Reactivity Controlled Compression Ignition (RCCI) is a one of many LTC strategies to dramatically reduce NOx production and simultaneously achieve fast combustion of lean mixtures to improving efficiency. In RCCI, two fuels of different reactivity are introduced early into the combustion chamber to adjust the phasing of combustion initiation and rate of combustion. In gas-diesel RCCI, natural gas is injected into the intake port and diesel is injected directly into the combustion chamber. With diesel common rail, it is possible to inject the diesel portion at various times and quantities up to the limitations of the injection system. Typically, the diesel is injected much earlier than normal diesel or gas-diesel dual-fuel as early as just after intake valve closing (IVC) to as late as 70° before top dead center (BTDC, where TDC is the crank position at which the piston is in its top most position within the cylinder). Additionally, the 'gain' switches sign, where in RCCI, earlier diesel timing leads to later combustion phasing—which is the opposite of diesel and dual-fuel combustion where earlier diesel leads to earlier combustion phasing.

Figure 7:
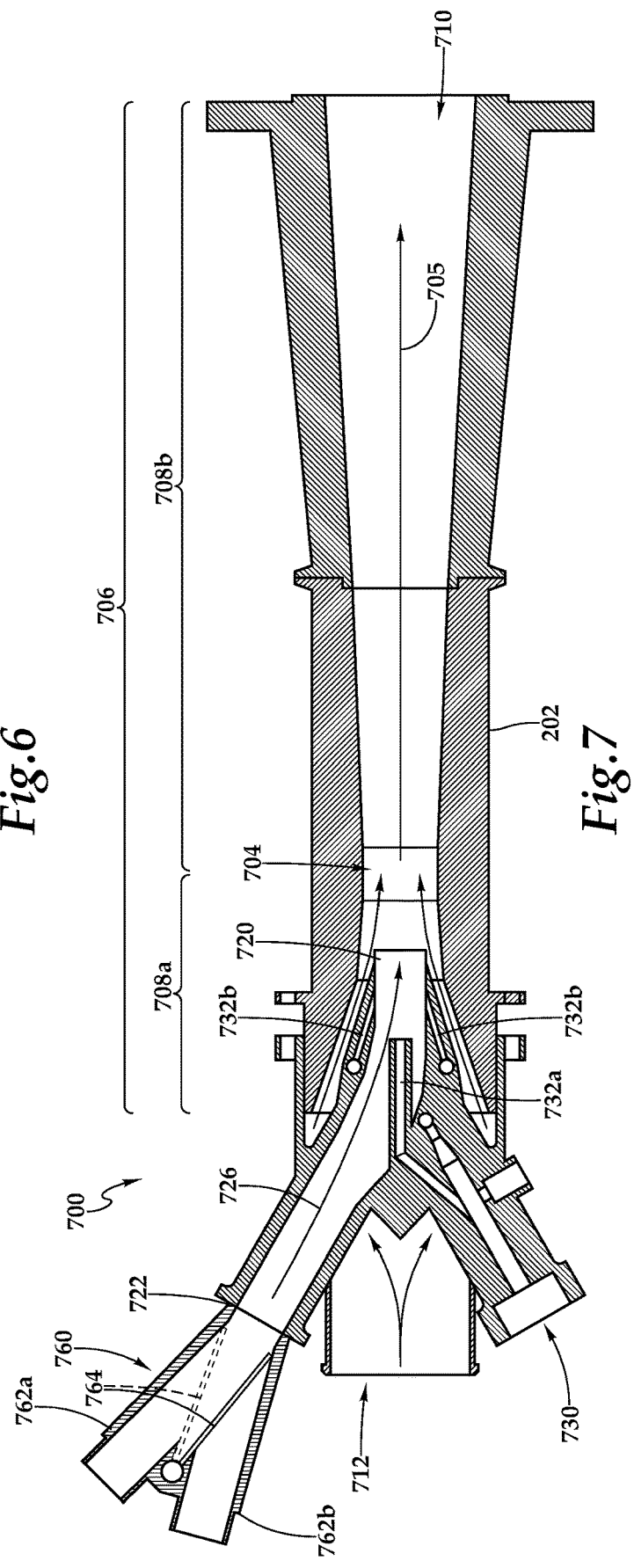
FIG. 7 is a half cross-sectional view schematic diagram of an example gas mixer.

FIG. 7 is a half cross-sectional view schematic diagram of an example gas mixer 700. In some embodiments, the gas mixer 700 can be the example ammonia gas injector 114 of FIG. 1. The gas mixer 700 includes a gas housing 702 that defines a mixing chamber 704 having an airflow path 705. The mixing chamber 704 is configured as a convergent-divergent nozzle 706 having a conically convergent portion 708a in which the airflow path 705 becomes constricted, and a conically divergent portion 708b in which the airflow path 705 expands to an outlet 710. In some implementations, the outlet 710 can be fluidically connected to an intake manifold such as the example intake manifold 104 of FIG. 1.

The gas mixer 700 includes an air inlet 712 to the convergent-divergent nozzle 706. In some implementations, the air inlet 712 can be fluidically connected to an intake plenum, such as the example intake plenum 103 of FIG. 1. The conically convergent portion 708a defines an air nozzle for incoming airflow. In general, air flows in through the air inlet 712 upstream of the convergent-divergent nozzle 706, converges in the conically convergent portion 708a, expands in the conically divergent portion 708b, and exits through the outlet 710, all along the airflow path 705. The conically convergent portion 708a converges in the direction of flow toward a convergent end. That is, the downstream end (outlet) of the conically convergent portion 708a has a smaller cross-sectional area (e.g., a smaller flow area) than the upstream end (air inlet 712). The conically divergent portion 708b diverges in the direction of flow toward a divergent end proximal the outlet 710. That is, the downstream end (outlet 710) of the conically divergent portion 708b has a larger cross-sectional area (e.g., a smaller flow area) than the upstream end.

The narrowing of the conically convergent portion 708a increases a flow velocity of airflow as it passes along the airflow path 705. In the conically divergent portion 708b, the cross-section of the flow passage along the air flow path 705 increases. The increase in cross-sectional area slows the flow velocity and raises the pressure of the fluid flow. In certain instances, the increase in cross-sectional area can be sized to increase a pressure within the gas mixer 700 so that the pressure drop across the gas mixer 700 is zero, nominal or otherwise small. In some embodiments, the convergent-divergent nozzle 706 can include threads or another form of removable attachment (e.g., a hose clamped around a flange) at the inlet 712, the outlet 710, or both to allow the convergent-divergent nozzle 706 to be installed and fluidically connected to the remainder of the intake of the engine system 100. Likewise, in some embodiments, the conically convergent portion 708a and the conically divergent portion 708b can be modularly interchangeable each other and/or with gas nozzles 720 of different geometries and configurations to make the system readily changeable to fit multiple engine applications.

The gas mixer 700 includes a gas nozzle 720 and a gas inlet 722. The gas inlet 722 is configured to receive a flow of a secondary gas (e.g., EGR gasses) and define a secondary gas flow path 726 through the gas nozzle 720. The gas nozzle 720 is positioned parallel to and centrally within the airflow path 705 and configured to supply the secondary gas (e.g., flowing along the secondary gas flow path 726) to the airflow path 705 within the convergent portion 708a of the convergent-divergent nozzle 706, upstream from the divergent portion 708b. The gas nozzle is configured to define a flow of secondary gas that is complimentary (e.g., cooperative, substantially parallel) to the flow of air along the airflow path 705.

In some embodiments, the gas nozzle 706 can be modularly interchangeable with gas nozzles 706 of different geometries, making the system readily changeable to fit multiple engine applications. For example, the gas nozzle 706 can be provided with threads or another form of removable attachment to the remainder of the gas housing 702. The illustrated example shows the conically convergent portion 708a, the conically divergent portion 708b, and the gas nozzle 706 aligned at a same center axis, but in some embodiments, these components may not be aligned or parallel. For example, space constraints may require the gas mixer 700 to have an angle between the axis of the conically convergent portion 708a and the conically divergent portion 708b. In some embodiments, rather than having a substantially straight flow passage as shown in FIG. 7, the flow passage may be curved.

The gas mixer includes a fuel inlet 730 configured to receive fuel (e.g., ammonia) from a fuel supply such as the example fuel supply 130 of FIG. 1. The fuel inlet 730 is fluidically connected to a collection of fuel inlet tubes 732a and 732b. The fuel inlet tubes 732a and 732b are configured as fuel nozzles to supply fuel into the second flow path upstream of the convergent nozzle to supply fuel to the secondary gas flow path 726. The fuel inlet tube 732a is positioned parallel to and centrally within the second flow path, the fuel inlet tube configured to supply fuel into the secondary gas flow path 726 upstream of the gas nozzle 720. The fuel inlet tubes 732b are positioned about the inner periphery of the gas nozzle 720 and are configured to supply fuel in the secondary gas flow path 726 proximal to the outlet of the gas nozzle 720. The fuel inlet tubes 732a-732b are configured to define flows of fuel that are complimentary (e.g., cooperative, substantially parallel) to the flow of secondary gas along the secondary gas flow path 726. In some embodiments, the fuel can be received at high pressure (e.g., 4-12 bar liquefied natural gas). As the fuel exits the fuel inlet tubes 732a-732b, the fuel flow helps drive the secondary gas flow.

In some implementations, the fuel inlet 730 can be a gaseous fuel inlet, coupled to a source of gaseous fuel. However, the fuel delivered by the fuel inlet 730 can include any combustible fluid, such as natural gas, gasoline, or diesel. While shown as a single tube, the fuel inlet 730 can be configured in other ways, for example as a cross through the flow area of the mixer, as fuel delivery holes along the perimeter of the flow area, or in another manner. While the illustrated example shows the fuel inlet tubes 732a-732b configured to inject fuel upstream of the divergent portion 708b, fuel can also be added with a fuel supply port upstream of the air inlet 712 or the secondary gas inlet 722. Such a port can include a gaseous fuel supply port. In some instances, the fuel can be delivered at high velocity, with velocities up to including sonic flow at the outlets of the fuel inlet tubes 732a-732b, such that a fuel-gas jet pump is created, allowing the fuel to provide additional motive force for the secondary gas flow 726 into and through the nozzle 720. In such examples, the higher pressures can generate a sonic jet that can further enhance the mixing of the fuel and air. In some implementations, this can reduce the need for a fuel pressure regulator. Additionally, if the fuel jet is cold via the Joules-Thompson effect, this cooling effect can cool the air/fuel stream, thus reducing the size and/or need for intake cooling (e.g., the intercooler 120).

In some implementations, the fuel inlet 730 can be a high-pressure fuel inlet. For example, high-pressure gaseous fuel (e.g., $NH_3$, $H_2$, or methanol or other low carbon fuel at about 10 to 500 bar gas pressure) can be provided through the fuel inlet tubes 762a-762b to help accelerate the airflow. In another example, liquefied gaseous fuel (e.g., $NH_3$, liquefied natural gas, $H_2$) can be heated under liquid conditions and then provided through the fuel inlet tubes 762a-762b, where the liquefied gaseous fuel can be injected into the air or EGR streams and "flashed" to create a very high velocity (e.g., sonic) jet so the heat addition increases the pumping effect.

In some implementations, the gas mixer 700 can be used in alternative configurations. For example, EGR is typically not used in diesel engine applications. However, other gasses such as ammonia can be supplied as a secondary gas at the gas inlet 722 and combined with diesel fuel flowing through the fuel inlet tubes 732a-732b to accelerate the ingestion of air. In a particular example, ammonia can be provided at 50 bar and combined in the gas mixer 700 to create a stoichiometric mixture (e.g., 15% ammonia and 85% air).

The gas mixer 700 also includes a check valve 760 with two gas inlets. The check valve 760 includes a gas inlet 762a and a gas inlet 762b. The gas inlet 762a is configured to receive secondary gasses (e.g., EGR) from a first source, such as the example EGR flow passage 108a. The gas inlet 762b is configured to receive secondary gasses (e.g., EGR) from a second, different source, such as the example EGR flow passage 108b. In some embodiments, gas inlets 762a-762b can include threads or another form of removable attachment (e.g., a hose clamped around a flange) at the gas inlets 762a-762b, the gas inlet 722, or any of these to allow the check valve 760 to be installed and fluidically connected to the remainder of the EGR system of the engine system 100.

In some embodiments, the gas mixer 760 can be fluidically connected to an engine system that is configured such that secondary (e.g., EGR) gasses flow as pulses that alternate between the gas inlet 762a and the gas inlet 762b. For example, the gas inlet 762a can be in fluidic communication with a first cylinder and the gas inlet 762b can be in fluidic communication with a second, different cylinder, and the first cylinder can be configured to exhaust while the second is not, and vice versa.

The check valve 760 also includes a valve 764. The valve 764 is configured as a flapper valve in which a pivoting valve body in which gas flow through one of the gas inlets 762a and 762b pushes the valve body open for the flowing gas inlet and block the other, preventing backflow from the gas inlet 762a to the gas inlet 762b, and preventing backflow from the gas inlet 762b to the gas inlet 762a. While the valve 764 is a flapper valve in the illustrated example, other forms of backflow-preventing valves can be used, such as check valves.

The gas nozzle 720 is configured to provide a high velocity gas path. The secondary gas path 726 is aerodynamically efficient to maintain a high velocity (e.g., from the exhaust manifolds 106a-106b). This enables the full total pressure of the secondary gas flow (e.g., static pressure plus dynamic pressure due to velocity). The fuel flow through the fuel inlet tubes 732a-732b adds additional momentum to the secondary gas flow along the secondary gas flow path 726. The secondary gas (e.g., EGR) and the fuel join to become a combined primary jet to create suction for the air flowing along the airflow path 705. This is a reversal of previous jet pumps where the air and fuel were combined as a primary flow in order to induce the secondary (e.g., EGR) gas flow. An example benefit of the illustrated example is that the pulse momentum of the secondary gas along the secondary gas path 726 accelerates the ingestion of air from the air inlet 712. In implementations in which the air flow is also pumped with its own high velocity, such as by the example compressor 122 of FIG. 1, the flow of the air can also provide a complementary lowering of the suction pressure as seen by the gas path, so that both flows can help to urge the flow of the other.

In some implementations, the gas mixer 700 can improve the performance of an engine. For example, by using the fuel flow and the secondary gas flow to accelerate, pump, or otherwise promote the flow of air, less compressor work may be needed from the turbine 122 to move the same amount of air. By reducing the amount of work needed of the turbine 122, the amount of backpressure in the exhaust manifolds 106a-106b can become reduced, thus reducing the power losses caused by the pumping work performed by the pistons during exhaust strokes. The gas mixer 700 can enable the use of high levels of EGR up to about 30%. Use of the gas mixer 700 can bring stoichiometric EGR engines close to lean engine in terms of efficiency, while allowed to use TWC, and as a result have near zero emissions.

In use, gas nozzle 720 and the conically convergent portion 708a increases the velocity and decreases the air pressure along the airflow path 705 in the gas mixer 700. Air is drawn along the airflow path 705 into the gas mixer 700 through the air inlet 712 in response to (e.g., because of) the decreased pressure of the jetted flow of the secondary gas exiting the gas nozzle 720. The secondary gas is directed along the secondary gas flow path 726 (e.g., from the exhaust manifolds 106a and 106b) eventually to the point downstream of the conically convergent portion 708a. The airflow, the secondary gas flow, and the fuel flow are mixed to form a combustion mixture. A pressure of the combustion mixture is increased and a velocity of the combustion mixture is reduced with a conically divergent portion 708b.

Figure 8:
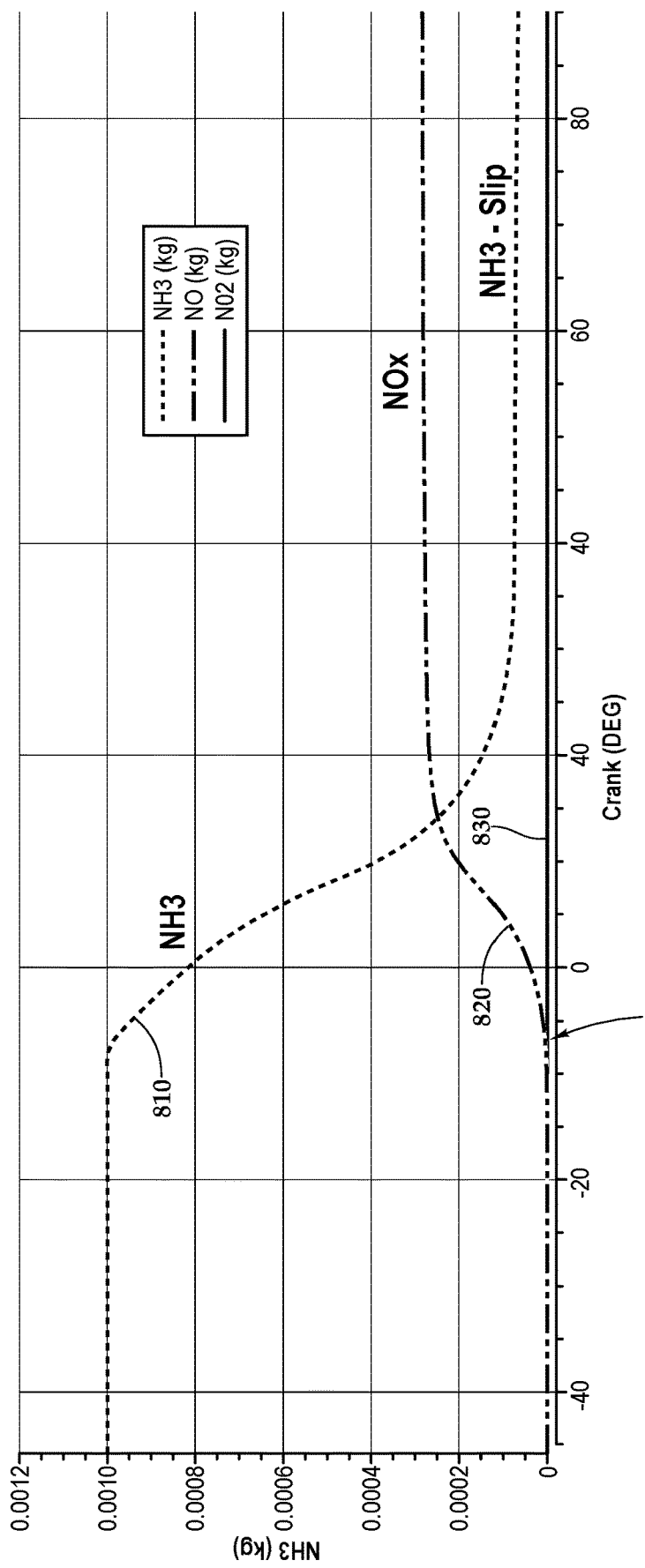
FIG. 8. shows a chart of example gas concentrations resulting from in-cylinder combustion of ammonia

FIG. 8 shows a chart 800 of example gas concentrations resulting from in-cylinder combustion of ammonia. In some implementations, the chart 800 can be a chart of gas concentrations resulting from combustion by the example engine system 100 of FIG. 1.

The chart 800 shows gas concentrations by weight compared to engine crank angle. The illustrated gas concentrations include $NH_3$ (ammonia) represented by line 810, nitric oxide (NO) represented by line 820, and nitrogen dioxide ($NO_2$) represented by line 830. As shown by the chart 800, when ammonia is used as a fuel, $NH_3$ levels start at a high, pre-combustion level (e.g., 0.001 kg), and NO and $NO_2$ levels are close to zero. At the start of combustion, at around −8° TDC in the illustrated example and represented by arrow 850, the levels of $NH_3$ begin to drop as it combusts with oxygen, resulting in a simultaneous rise in the level of NO as a combustion byproduct.

As combustion continues, the available oxygen becomes depleted and the rate of combustion slows, also slowing the rate of change in the amounts of $NH_3$ and NO in the cylinder, eventually stabilizing to around 0.0003 kg of NO and 0.0008 kg of $NH_3$. These gasses, at the resulting concentrations, eventually get expelled from the cylinder during the exhaust stroke as exhaust gasses. The remaining $NH_3$ in the exhaust gas is commonly referred to as "ammonia slip". NO and $NH_3$ are both generally considered to be pollutants, and many jurisdictions have regulations that limit the amounts of such gasses that are allowable as tailpipe emissions.

Figure 9:
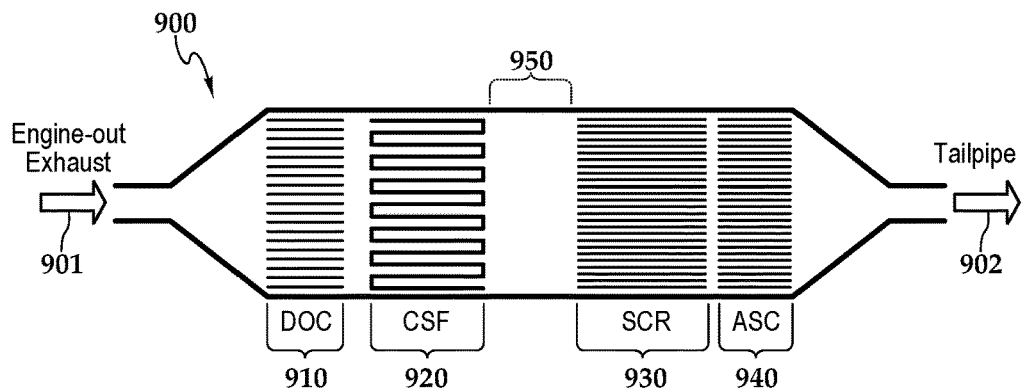
FIG. 9 is a schematic of a cross-sectional view of an example diesel after-treatment system.

FIG. 9 is a schematic of a cross-sectional view of an example diesel after-treatment system 900. In some embodiments, the exhaust after-treatment system 900 can be the example exhaust after-treatment system 150 of FIG. 1. In some embodiments, the exhaust after-treatment system 900 can be a catalytic converter system.

The illustrated exhaust after-treatment system 900 is configured to receive engine-out exhaust gasses 901 (e.g., gasses expelled from engine cylinders in the exhaust stroke) and reduce the amounts of various pollutant gasses before they exit as tailpipe emissions 902. The engine-out exhaust gasses 901 can include gasses such as carbon monoxide (CO), hydrocarbons (HC), NOx, particulate matter (PM), carbon dioxide ($CO_2$), water ($H_2O$), and diatomic nitrogen ($N_2$). The objective of the operation of the exhaust after-treatment system 900 is to substantially remove everything other than $CO_2$, $H_2O$, and $N_2$ before exiting as the tailpipe emissions 902.

The exhaust after-treatment system 900 includes several treatment sections. A diesel oxidation catalyst (DOC) filter 910 is provided to reduce CO, HC, and PM emissions. For example:

$$2CO_2+O_2 \rightarrow 2CO_2$$

$$[HC]+O2 \rightarrow CO_2+H_2O$$

$$2NO_2+O2 \rightarrow NO_2$$

A catalyzed soot filter (CSF) 920 is provided to collect PM and suppress CO emissions during combustion of the collected PM. Cleaning of carbon PM from the SCF 920 (e.g., diesel particulate filter (DPF) regeneration) can be performed actively and/or passively. For example:

$$(Active)\ C+O_2 \rightarrow CO_2$$

$$(Passive)\ C+2NO_2 \rightarrow CO_2+2NO$$

A selective catalytic reduction (SCR) filter 930 uses a reductant agent (e.g., ammonia) and a catalyst to set off a chemical reaction that converts NOx into nitrogen, water and tiny amounts $CO_2$. For example:

$$4NH_3+4NO+O_2 \rightarrow +4N_2+6H_2O$$

$$4NH_3+2NO+2NO_2 \rightarrow +4N_2+6H_2O$$

$$8NH_3+6NO_2 \rightarrow +7N_2+12H_2O$$

An ammonia slip catalyst (ASC) filter 940 is provided to convert residual ammonia (e.g., ammonia slip) and convert it to nitrogen and water. For example:

$$[NH_3] \rightarrow N_2+H_2O$$

$$NOx+NH_3 \rightarrow +N_2+H_2O$$

In typical (e.g., non-dual-fuel) diesel applications, the reductant agent that is used by the SCR filter 930 is high-grade urea, commonly known as diesel exhaust fluid (DEF), that must be supplied to the SCR filter 930. When heated by the hot exhaust gasses the DEF vaporizes and decomposes into ammonia and carbon dioxide. The ammonia acts as the reductant agent for reducing NO and $NO_2$ levels. However, excess ammonia (e.g., ammonia slip) is also commonly regulated as a pollutant gas. Excess ammonia provided by the DEF is subsequently reduced by the ASC filter 940. For example:

$$4NH_3+3O_2 \rightarrow +2N_2+6H_2O$$

Notable in the illustrated example diesel after-treatment system 900 is the omission of a urea (e.g., DEF) mixer at a location 950. The diesel after-treatment system 900 is configured without a urea mixer 950 because the ammonia required by the SCR filter 930 can be obtained from the engine-out exhaust 901. In a dual-fuel, ammonia-diesel engine, such as the example engine system 100 of FIG. 1, the use of ammonia as a fuel can result in ammonia slip inherently remaining in the exhaust gasses, as discussed previously in the description of FIG. 8. Such inherent ammonia slip can be used as some or all of the reductant agent required by the SCR filter 930, reducing or eliminating the need for DEF and/or a urea mixer in the diesel after-treatment system 900. Excess ammonia, if any, remaining after treatment by the SCR filter 930 is reduced by the ASC filter 940. ASC filters can be included and appropriately sized to reduce or eliminate any $NH_3$ remaining after use by the NOx reactions.

Furthermore, combustion can be controlled (e.g., by the example ECU 202 and/or the air/fuel module 204 of FIG. 2) to produce a predetermined amount of amount of ammonia slip to cause the SCR to reduce NOx levels to or below a target amount (e.g., as established by government regulations). For example, in some instances the amount of ammonia slip in the engine-out exhaust 901 may not be sufficient for full operation of the SCR filter 930, which can result in excessive emissions of NO and $NO_2$. In some such instances, the mixture and combustion of ammonia and diesel can be purposely controlled to increase the amount of ammonia slip if needed to provide sufficient amounts of ammonia for use by the SCR filter 930. In other words, the ammonia fuel can also be used as the reductant in the catalytic process, reducing or eliminating the need for DEF and/or a urea mixer in the diesel after-treatment system 900. Excess ammonia, remaining after treatment by the SCR filter 930 is reduced by the ASC filter 940. ASC filters can be included and appropriately sized to reduce or eliminate any $NH_3$ remaining after use by the NOx reactions.

Figure 10:
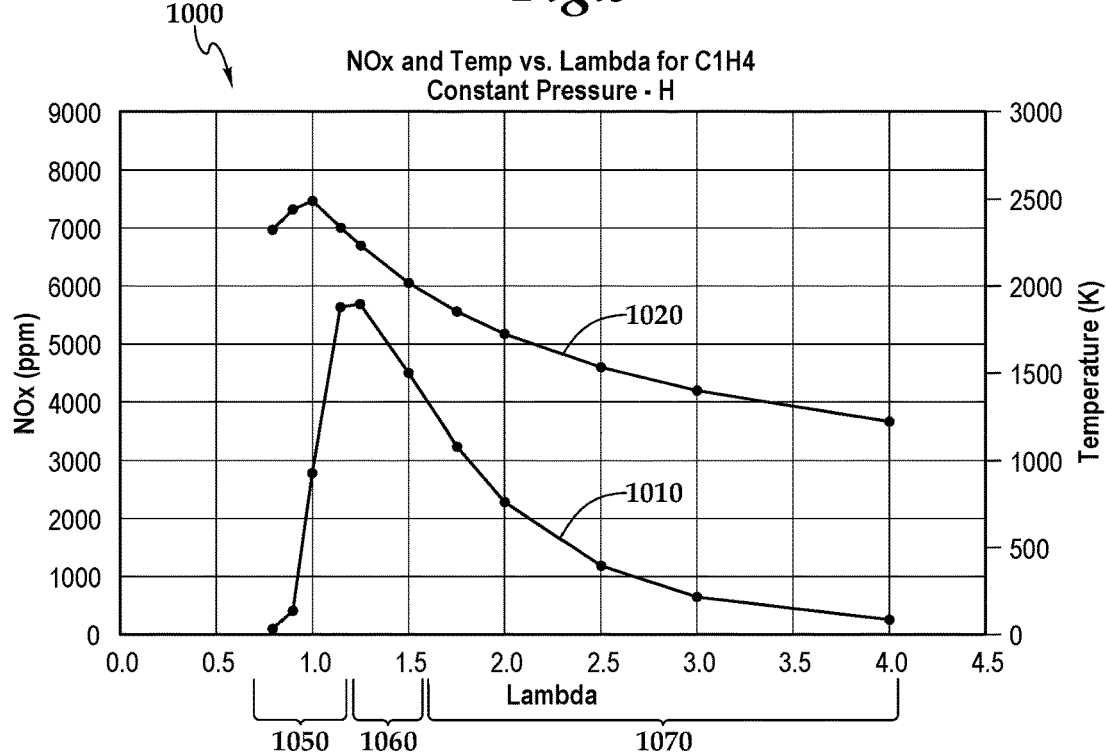
FIG. 10 shows a chart of example exhaust gas outputs.

FIG. 10 shows a chart 1000 of example NOx formation due to fuel combustion in air (e.g., NOx in the example engine-out exhaust 901 of FIG. 9 from, for example, the example engine 201 of FIG. 2). NOx formation due to combustion is a function of both lambda (e.g., excess air ratio) and temperature. NOx concentration is represented by a line 1010, and temperature is represented by a line 1020.

It is possible to control NOx level directly in at least two ways. For example, lambda can be controlled by controlling air-fuel ratios (AFR) provided to the combustion process. In another example, combustion phasing can be controlled (e.g., more advanced leads to more NOx, more retarded less NOx).

In the illustrated example, it can be seen that there is a regime 1050 in which minimum NOx formation 1010 occurs when the mixture is rich (e.g., lambda<about 1.0). In a second regime 1060, the maximum NOx formation 1010 is near lambda or a lambda of about 1.25, where the temperature 1020 is high and there is excess oxygen due to lean AFR mixture. In a third regime 1070, the effect of excess air reduces the temperature effect faster than the excess $O_2$ effect, resulting in an exponential reduction in NOx formation from lambda of about 1.25 and up, such that at lambda>about 1.75, lean combustion reduces NOx formation 1010 below the stoichiometric point.

In some implementations, a control strategy can be implemented to control combustion phasing. For example, the example engine system 100 can use in-cylinder pressure sensing, real-time combustion and diagnostic control (e.g., active combustion control), and control air-fuel ratios to adjust NOx production. In some examples, the control strategy can be configured to keep the $NH_3$ to NOx ratio in the high efficiency range of the exhaust after-treatment system (e.g., lambda between about 1.0 to about 1.2).

In some embodiments, NOx and $NH_3$ sensors can be used at the inlet and/or outlet of the engine exhaust after-treatment system 900 (e.g., engine exhaust after-treatment system 900) as controller feedback in a closed-loop control strategy to adjust the NOx production in cylinder so as to manage the effectiveness of the engine exhaust after-treatment system. For example, the ECU 202 and/or the air/fuel module 204 can be configured to receive sensor feedback from the engine exhaust after-treatment system 900 to measure the efficiency and effectiveness of the engine exhaust after-treatment system 900, and adjust engine operation to reduce NOx production (e.g., by >about 90%) and/or the consumption of $NH_3$ (e.g., to reduce the ASC filter 940 requirements). In some implementations, the strategy can be configured to control in-cylinder combustion to produce a $NH_3$ to NOx ratio between about 1.0 and about 1.2, so that both are reduced in the combination of the SCR filter 930 and ASC filter 940 without use of a urea doser (e.g., without a DEF system).

Figure 11:
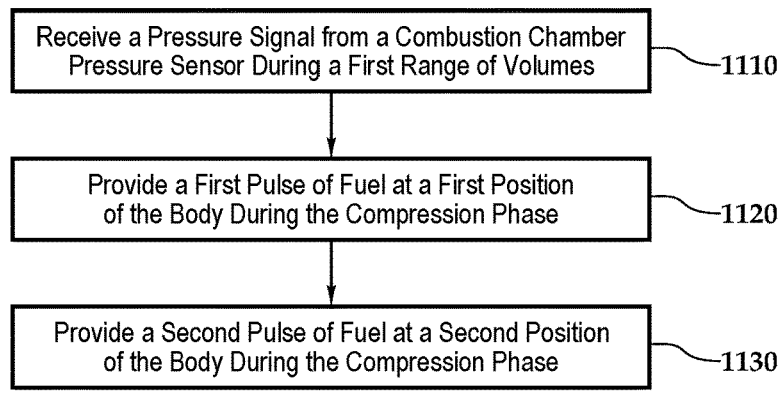
FIG. 11 is a flow diagram of an example process for controlling an internal combustion engine system.

FIG. 11 is a flow diagram of an example process 1100 for controlling an internal combustion engine system. The process 1110 is performed in connection with an internal combustion engine having a body sealed in a combustion chamber, the body being moveable to a center position to compress gas in a compression phase and movable from the center position by expanding combustion gasses in an expansion phase, each position of the body defining a volume of the combustion chamber. In some implementations, the example process 1100 can be performed by all or part of the example engine system 100 of FIG. 1 and/or the example engine system 200 of FIG. 2.

At 1110, a pressure signal is received from a combustion chamber pressure sensor during a first range of volumes, the first range corresponding to a portion of a compression phase, the received pressure being a first pressure. For example, the example ECU 202 can receive in-cylinder pressure feedback signals from the example high-speed pressure sensor 272 during a first range of crank angles and/or piston positions.

At 1120, a first pulse of fuel is provided, based on the received pressure signal, at a first position of the body during the compression phase. For example, the air/fuel module 204 and/or the ignition module 206 can cause a first pulse of fuel to be provided to the engine cylinder 208 based on pressure feedback from the high-speed pressure sensor 272. In some implementations, the pressure signal can be received during a prior combustion cycle, and used to configure the first pulse during a subsequent (e.g., next) combustion cycle. In some implementations, the pressure signal can be received and used within the same combustion cycle. In some implementations, the first pulse of fuel can be further configured to prepare an air/fuel mixture in the combustion chamber that is near auto-ignition. For example, the first pulse of fuel can be configured such that the amount of fuel is just barely insufficient to cause auto-ignition during the compression stroke. In some implementations, the first pulse can be delivered at the example points 442 and/or 542 of FIGS. 4 and 5.

At 1130, a second pulse of fuel is provided, based on the received pressure signal, at a second position of the body during the compression phase. For example, the air/fuel module 204 and/or the ignition module 206 can cause a second pulse of fuel to be provided to the engine cylinder 208 based on pressure feedback from the high-speed pressure sensor 272. In some implementations, the pressure signal can be received during a prior combustion cycle, and used to configure the second pulse during a subsequent (e.g., next) combustion cycle. In some implementations, the pressure signal can be received and used within the same combustion cycle. In some implementations, the process can work by monitoring the previous cycle with pressure sensing and crank angle position (e.g., converted to volume) and looking for key combustion metrics, such as "start of combustion" (e.g., CA10 or 10% MFB or 10% of combustion) and the center of combustion (e.g., CA50, 50% MFB (mass fraction burned)). From the previous cycle, this cycle can be adjusted to control these parameters to a target value. The target values can be set by good combustion phasing, safe operation, and/or the ratio of $NH_3$ to NOx.

Some implementations of RCCI methods (e.g., also known as an Advanced Low Temperature combustion method—Reactivity Controlled Compression Ignition) can use the following: (a) a charge of air and a primary fuel (e.g., $NH_3$), (b) after intake valve closure, some level of compression, (c) a secondary fuel (e.g., diesel) is directly injected early in the cycle (e.g., when the temperatures are too low to ignite the diesel fuel, (d) additional compression occurs, which enables diesel fuel droplets to disperse, vaporize and mix with the primary charge, (e) additional compression leads to reaching an auto-ignition temperature for the diesel vapor which has mixed to near the stoichiometric range (e.g., lambda ~1.0), and (f) volumetric auto-ignition occurs, which volumetrically ignites the mixture. The heat release spreads via a wave of auto-ignition precursors (e.g., rather than a traditional flame front). In some implementations, in order to assist or anchor the auto-ignition event, a second injection of the secondary fuel can be used to trigger the volumetric ignition (e.g., "ignition assisted HCCI/RCCI").

In some implementations, the process 1100 can also include starting combustion in the combustion chamber based on the second pulse of fuel. For example, the second pulse of fuel can be configured such that the amount of additional fuel triggers auto-ignition during the compression stroke. In some implementations, the second pulse can be delivered at the example points 444 and/or 544 of FIGS. 4 and 5.

In some implementations, the process 1100 can also include controlling CA50 using at least one of the first pulse of fuel or the second pulse of fuel. For example, the ECU 202 can be configured to deliver fuel with timings and volumes that can cause 50% of the fuel to be burned by the time the piston reaches a predetermined position or the crank reaches a predetermined crank angle.

In some implementations, the process 1100 can include controlling a ratio of $NH_3$/NOx resulting from combustion of diesel fuel, ammonia fuel, and air during the expansion phase using at least one of the first pulse of fuel or the second pulse of fuel. For example, as shown in FIGS. 4, 5, 8, and 10, the timing and volumes of multiple pulses of fuel can be selected in order to control the amounts of NOx and $NH_3$ that remain in engine-out exhaust gasses. In some implementations, the ratio of $NH_3$/NOx can be selected to be greater than 1. In some implementations, the ratio of $NH_3$/NOx can be selected to be less than about 1.2.

In some implementations, the process 1100 can include receiving, by an exhaust after-treatment system, free ammonia present in exhaust gasses, and catalyzing, by the exhaust after-treatment system, NOx based on free ammonia (e.g., which is common place today in SCR (selective catalytic reaction) system). For example, the example engine system 100 can include the exhaust after-treatment system 150 to treat exhaust gasses before they exit the tailpipe 160. In another example, the example exhaust after-treatment system 900 of FIG. 9 can be used to catalyze exhaust gasses as they pass from the engine-out exhaust 901 to the tailpipe 902.

In some implementations, the process 1100 can include controlling an amount of free ammonia present in exhaust gasses based on at least one of the first pulse of fuel or the second pulse of fuel. In particular, by adjusting the center of combustion (CA50) forward phasing to increase NOx and reduce $NH_3$ slip and thus reduce the $NH_3$/NOx ratio, or retard CA50 setpoint to increase the $NH_3$ to NOx ratio. For example, the example ECU 202 can control one or more of an air/diesel fuel ratio, an air/ammonia fuel ratio, a diesel/ammonia ratio, a first pulse fuel volume, a second pulse fuel volume, a first pulse fuel timing, and/or a second pulse fuel timing to cause a predetermined amount of ammonia slip at the end of combustion. The free ammonia in the ammonia slip can then be used by the example SCR filter 930 to reduce NOx emissions, and the ASC filter 940 can be used to reduce the amount of free ammonia left after catalysis.

Figure 12:
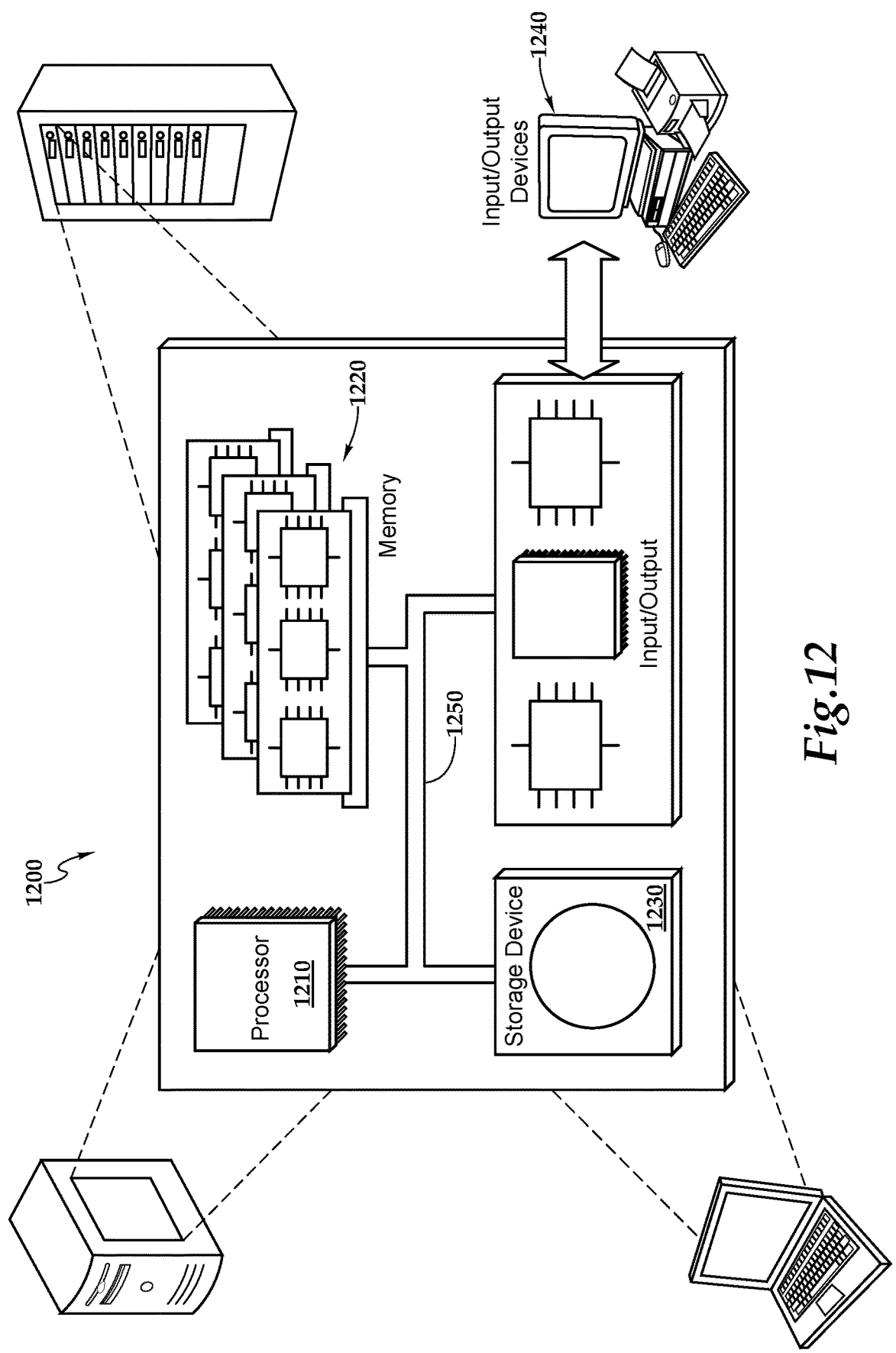
FIG. 12 is a schematic diagram of an example of a generic computer system.

FIG. 12 is a schematic diagram of an example of a generic computer system 1200. The system 1200 can be used for the operations described in association with the example method 1100 of FIG. 11 according to one implementation. For example, the system 1200 may be included in either or all of the ECU 202, the air/fuel module 204, the ignition module 206, the RT-CDC 611, or the ECU 602.

The system 1200 includes a processor 1210, a memory 1220, a storage device 1230, and an input/output device 1240. Each of the components 1210, 1220, 1230, and 1240 are interconnected using a system bus 1250. The processor 1210 is capable of processing instructions for execution within the system 1200. In one implementation, the processor 1210 is a single-threaded processor. In another implementation, the processor 1210 is a multi-threaded processor. The processor 1210 is capable of processing instructions stored in the memory 1220 or on the storage device 1230 to display graphical information for a user interface on the input/output device 1240.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1200. In one implementation, the storage device 1230 is a computer-readable medium. In various different implementations, the storage device 1230 may be a floppy disk device, a hard disk device, an optical disk device, or a tape device.

The input/output device 1240 provides input/output operations for the system 1200. In one implementation, the input/output device 1240 includes a keyboard and/or pointing device. In another implementation, the input/output device 1240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An apparatus for controlling operation of an internal combustion engine, the engine comprising a body sealed in a combustion chamber, the body being moveable to a top dead center position to compress at least one of a gas or a gas/liquid mixture in a compression phase and movable from the top dead center position by expanding combustion gasses in an expansion phase, each position of the body defining a volume of the combustion chamber, and the apparatus comprising:
a processor to receive input from a position sensor configured to sense a position of the body corresponding to the volume of the combustion chamber and from a combustion chamber pressure sensor, the processor configured to:
receive, during the compression phase, a pressure signal from the combustion chamber pressure sensor during a first range of volumes, the first range corresponding to a portion of the compression phase, the received pressure signal being representative of a first pressure;
provide, during the compression phase and based on the received pressure signal received during the compression phase, a first signal configured to provide a first pulse of fuel at a first position of the body; and
provide, during the compression phase and based on the received pressure signal received during the compression phase, a second signal configured to provide a second pulse of fuel at a second position of the body.

2. The apparatus of claim 1, wherein the first signal is further configured to prepare an air/fuel mixture that is near auto-ignition upon compression.

3. The apparatus of claim 1, wherein the second signal is further configured to start combustion in the combustion chamber.

4. The apparatus of claim 1, wherein the second signal is further configured to control at least one of CA50 or CA10.

5. The apparatus of claim 1, wherein the second signal is further configured to control a ratio of $NH_3/NOx$ resulting from combustion of diesel fuel, ammonia fuel, and air.

6. The apparatus of claim 5, wherein the ratio is about 1.

7. The apparatus of claim 6, wherein the ratio is less than about 1.2.

8. The apparatus of claim 1, further comprising an exhaust after-treatment system configured to receive free ammonia present in exhaust gasses and catalyze NOx based on ammonia.

9. A method performed in connection with an internal combustion engine comprising a body sealed in a combustion chamber, the body being moveable to a top dead center position to compress at least one of a gas or a gas/liquid mixture in a compression phase and movable from the top dead center position by expanding combustion gasses in an expansion phase, each position of the body defining a volume of the combustion chamber, and the method comprising:
receiving, during the compression phase, a pressure signal from a combustion chamber pressure sensor during a first range of volumes, the first range corresponding to a portion of the compression phase, the received pressure signal being representative of a first pressure;
providing, during the compression phase and based on the received pressure signal received during the compression phase, a first pulse of fuel at a first position of the body; and
providing, during the compression phase and based on the received pressure signal received during the compression phase, a second pulse of fuel at a second position of the body.

10. The method of claim 9, wherein the first pulse of fuel is further configured to prepare an air/fuel mixture that is near auto-ignition.

11. The method of claim 9, further comprising starting combustion in the combustion chamber based on the second pulse of fuel.

12. The method of claim 9, further comprising controlling at least one of CA50 or CA10 based on at least one of the first pulse of fuel or the second pulse of fuel.

13. The method of claim 9, further comprising controlling a ratio of $NH_3/NOx$ resulting from combustion of diesel fuel, ammonia fuel, and air based on at least one of the first pulse of fuel or the second pulse of fuel.

14. The method of claim 13, wherein the ratio is about 1.

15. The method of claim 14, wherein the ratio is less than about 1.2.

16. The method of claim 9, further comprising:
receiving, by an exhaust after-treatment system, free ammonia present in exhaust gasses; and
catalyzing, by the exhaust after-treatment system, NOx based on free ammonia.

17. The method of claim 16, further comprising controlling an amount of free ammonia present in exhaust gasses based on at least one of the first pulse of fuel or the second pulse of fuel.

* * * * *